United States Patent [19]

Hayashi et al.

[11] Patent Number: 4,781,022
[45] Date of Patent: Nov. 1, 1988

[54] SWASH PLATE TYPE HYDRAULIC SYSTEM

[75] Inventors: Tsutomu Hayashi, Tokyo; Nobuyuki Yagigaya, Chiba; Masaie Kato, Tokyo; Kazuhiko Nakamura, Kanagawa; Yoshihiro Yoshida, Tokyo; Yoshihiro Nakajima, Tokyo; Mitsuru Saito, Tokyo, all of Japan

[73] Assignee: Honda Giken Kogyo Kabushiki Kaisha, Tokyo, Japan

[21] Appl. No.: 5,043

[22] Filed: Jan. 20, 1987

[30] Foreign Application Priority Data

Jan. 20, 1986 [JP] Japan .................................. 61-9633
Mar. 24, 1986 [JP] Japan ................................ 61-65485

[51] Int. Cl.⁴ .............................................. F16D 33/00
[52] U.S. Cl. ...................................... 60/489; 60/490
[58] Field of Search ................................ 60/489, 490

[56] References Cited

U.S. PATENT DOCUMENTS

| Re. 24,317 | 5/1957 | Schott . | |
|---|---|---|---|
| 1,263,180 | 4/1918 | Williams . | |
| 1,533,399 | 4/1925 | Dunlap . | |
| 2,388,462 | 11/1945 | Beeh . | |
| 2,395,980 | 3/1946 | Wahlmark . | |
| 2,651,386 | 9/1953 | Rossell | 188/98 |
| 2,662,375 | 12/1953 | Postel . | |
| 2,683,421 | 7/1954 | Woydt . | |
| 2,844,002 | 7/1958 | Pavesi . | |
| 2,907,230 | 10/1959 | Kollmann | 74/687 |
| 2,957,421 | 10/1960 | Mock . | |
| 2,984,070 | 5/1961 | Bauer . | |
| 3,036,434 | 5/1962 | Mark . | |
| 3,054,263 | 9/1962 | Budzich . | |
| 3,065,700 | 11/1962 | Blenkle . | |
| 3,131,539 | 5/1964 | Creighton . | |
| 3,133,418 | 5/1964 | Froebe . | |
| 3,143,858 | 8/1964 | Roeske . | |
| 3,165,892 | 1/1965 | Roberts . | |
| 3,170,297 | 2/1965 | Larson . | |
| 3,175,363 | 3/1965 | Molly . | |
| 3,187,868 | 6/1965 | Gantzer | 192/101 |
| 3,204,411 | 9/1965 | Stockton . | |
| 3,213,619 | 10/1965 | Creighton . | |
| 3,274,947 | 9/1966 | Jonkers . | |
| 3,313,108 | 4/1967 | Allgaier . | |
| 3,372,545 | 3/1968 | Hyde . | |
| 3,373,635 | 3/1968 | Meurer . | |
| 3,382,813 | 5/1968 | Schauer . | |
| 3,416,312 | 12/1968 | Margolin . | |
| 3,455,184 | 7/1969 | Frandsen et al. . | |
| 3,543,514 | 12/1970 | Reimer . | |
| 3,620,130 | 11/1971 | Roberts | 91/506 |
| 3,698,189 | 10/1972 | Reimer . | |
| 3,834,164 | 9/1974 | Ritter . | |
| 4,080,992 | 3/1978 | Niederer | 137/636 |
| 4,086,822 | 5/1978 | Kuroda | 74/473 R |
| 4,170,279 | 10/1979 | Pelletier | 188/300 |
| 4,650,056 | 3/1987 | Sevennec et al. | 192/90 |

FOREIGN PATENT DOCUMENTS 23390 8/1936 Australia .
(List continued on next page.)

OTHER PUBLICATIONS

G. Neimann, "Maschinenelemente", 1983, pp. 68, 82 & 83.

Primary Examiner—Gerald A. Michalsky
Attorney, Agent, or Firm—Lyon & Lyon

[57] ABSTRACT

In a swash plate type hydraulic system such as a hydraulic pump, a hydraulic motor of the like, a group of cylinder bores in which plungers engaging a swash plate are slidably received are annularly arranged in a cylinder block, and higher and lower pressure oil passages are concentrically provided in the cylinder block. Further, a group of distributor valves are provided in the cylinder block in a radially arranged configuration for controlling the connection and disconnection between the higher and lower pressure oil passages and the group of cylinder bores by radial reciprocating motion of the valves, and an eccentric wheel is provided eccentrically with respect to the center of rotation of the cylinder block to abut against the outer ends of the distributor valves so as to impart a reciprocating motion to each of the distributor valves. A shifting device is provided for changing the eccentric relationship between the eccentric wheel and the cylinder block.

45 Claims, 24 Drawing Sheets

FOREIGN PATENT DOCUMENTS

| | | |
|---|---|---|
| 143400 | 5/1950 | Australia . |
| 231526 | 4/1959 | Australia . |
| 268529 | 11/1963 | Australia . |
| 143921 | 12/1935 | Austria . |
| 191742 | 9/1957 | Austria . |
| 240661 | 6/1965 | Austria . |
| 317649 | 12/1919 | Fed. Rep. of Germany . |
| 880989 | 7/1949 | Fed. Rep. of Germany . |
| 1200135 | 9/1965 | Fed. Rep. of Germany . |
| 1480553 | 6/1969 | Fed. Rep. of Germany . |
| 1500480 | 7/1969 | Fed. Rep. of Germany . |
| 1625039 | 5/1970 | Fed. Rep. of Germany . |
| 1951381 | 8/1977 | Fed. Rep. of Germany . |
| 2456473 | 8/1977 | Fed. Rep. of Germany . |
| 3139191 | 4/1983 | Fed. Rep. of Germany . |
| 791714 | 12/1935 | France . |
| 32-7159 | 9/1957 | Japan . |
| 41-3208 | 3/1966 | Japan . |
| 46-11852 | 3/1971 | Japan . |
| 56-143856 | 11/1981 | Japan . |
| 57-70968 | 5/1982 | Japan . |
| 59-38467 | 9/1984 | Japan . |
| 61-153057 | 7/1986 | Japan . |
| 473997 | 4/1969 | Switzerland . |
| 535555 | 4/1941 | United Kingdom . |
| 574991 | 1/1946 | United Kingdom . |
| 835936 | 5/1960 | United Kingdom . |
| 890591 | 3/1962 | United Kingdom . |
| 902978 | 8/1962 | United Kingdom . |
| 1021873 | 3/1966 | United Kingdom . |
| 1222200 | 2/1971 | United Kingdom . |
| 1282094 | 7/1972 | United Kingdom . |
| 1521494 | 8/1978 | United Kingdom . |
| 2104976 | 3/1983 | United Kingdom . |

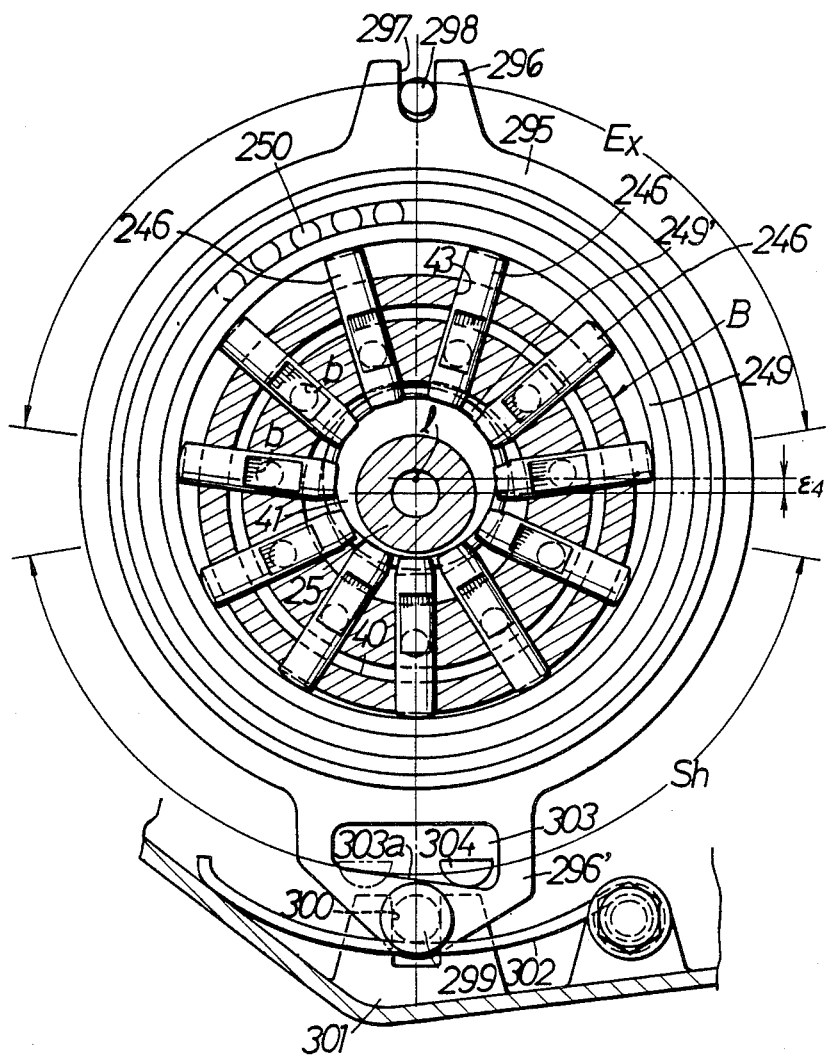

SWASH PLATE TYPE HYDRAULIC SYSTEM

BACKGROUND OF THE INVENTION

1. Field of the Invention

The present invention relates to a swash plate type hydraulic system for use as a swash plate type hydraulic pump and hydraulic motor, and more particularly, to a swash plate type hydraulic system which includes a number of cylinder bores annularly arranged so that the transfer of a working oil is conducted between each of the cylinder bores and higher and lower oil passages concentrically defined in a cylinder block including a group of plungers slidably received in the cylinder bores during relative rotation between the cylinder block and a member supporting a swash plate engaging the protruding ends of the plungers, wherein a number of distributor valves are provided in the cylinder block in a radially arranged configuration for reciprocation between radially outer and inner positions to permit the respective cylinder bores to alternately communicate with the higher and lower pressure oil passages, and an eccentric wheel is provided eccentrically with respect to a center of rotation of the cylinder block to engage the distributor valves so as to permit each of the distributor valves to reciprocate with the relative rotation between the cylinder block and the swash plate supporting member.

2. Description of the Prior Art

In such a swash plate type hydraulic system, it is necessary to short circuit or interrupt the communication between higher and lower pressure oil passages depending upon required operation modes. Swash plate type hydraulic systems previously proposed by the assignee of the present patent application include control valve means exclusively used for such short circuiting and communication interrupting operations [e.g., see Japanese patent application laid-open No. 153057/86 (Japanese patent application No. 277816/84)].

In the above swash plate type hydraulic systems, both working oil distributing valves and control valve means are provided, becoming an obstacle to a compactness and a decrease in cost for the hydraulic system.

SUMMARY OF THE INVENTION

The present invention has been accomplished with such circumstances in view, and it is an object of the present invention to provide a swash plate type hydraulic system as described above, which can be dispensed with the control valve means which has been conventionally and exclusively used, thereby providing a simplification in arrangement, and nevertheless has a mechanism equivalent to the conventional control valve means.

According to the present invention, the above object is accomplished by providing a swash plate type hydraulic system comprising a cylinder block having a number of cylinder bores annularly arranged therein, a group of plungers each slidably received in each of the cylinder bores, a swash plate engaging those ends of the plungers which protrude from the cylinder bores, and higher and lower pressure oil passages concentrically defined in the cylinder block in a manner distanced from each other, wherein the transfer of a working oil between the cylinder bores and the higher and lower oil passages is conducted during relative rotation between the cylinder block and the swash plate supporting member, and wherein a plurality of distributor valves are provided in the cylinder block in a radially arranged configuration for reciprocation between radially outer and inner positions to permit the respective cylinder bores to alternately communicate with the higher and lower pressure oil passages; an eccentric wheel is provided to abut against outer ends of the distributor valves in such a manner to permit each of the distributor valves to reciprocate interlockingly with the relative rotation between the cylinder block and the swash plate supporting member when the eccentric wheel assumes a position eccentric with respect to the center of rotation of the cylinder block, and a shifting device is provided for shifting an eccentric relationship of the eccentric wheel with respect to the center of rotation of the cylinder block.

With the above construction, since the shifting device is provided for shifting the eccentric relationship of the eccentric wheel with respect to the center of rotation of the cylinder block, it is possible to freely vary the amount of protrusion of the distributor valve located at a predetermined angle of rotation of the cylinder block to short circuit the higher and lower pressure oil passages, or to bring the eccentric wheel into a state concentric with the cylinder block to cease the reciprocation of the distributor valves, thereby cutting off the communication between the higher and lower pressure oil passages and the individual cylinder bores through the distributor valves.

This is particularly cenvenient for utilization of this hydraulic system in a hydraulic pump and a hydraulic motor constituting a continuously variable transmission for motorcycles, four-wheeled automobiles or the like, and enables the efficient controlling of the transmission of power from a power source to a drive wheel without complication of the arrangement.

Even in an arrangement in which a swash plate type hydraulic pump and a swash plate type hydraulic motor are integrally formed, a higher pressure oil passage and a lower pressure oil passage are concentrically disposed in a bonded portion between a pump cylinder and a motor cylinder, the higher and lower pressure oil passages are put into communication with a group of cylinder bores having pump plungers slidably received therein and a group of cylinders having motor plungers slidably received therein by respective separate groups of distributor valves, it is also possible to shift the eccentric position(s) of one or both of eccentric wheels each engaging the protruding ends of each of the groups of the distributor valves by the shifting device according to the present invention.

The above and other objects, features and advantages of the invention will become apparent from reading of the following detailed description of the preferred embodiments taken in conjunction with the accompanying drawings.

BRIEF DESCRIPTION OF THE DRAWINGS

Brief description will be made of the accompanying drawings illustrating several embodiments.

FIGS. 1 to 13 illustrate a first embodiment of the present invention, wherein

FIG. 1 is a plan view in vertical section of a hydrostatic continuously variable transmission interposed in a power transmitting system for a motorcycle;

FIG. 2 is a back view in vertical section of the transmission;

FIG. 3 is a sectional view taken along the line III—III of FIG. 2;

FIGS. 4 and 5 are sectional views taken along the lines IV—IV and V—V of FIG. 2, respectively;

FIGS. 6 to 8 are operative views similar to FIG. 5;

FIG. 9 is a perspective view of a first distributor valve;

FIG. 10 is a perspective view of a second distributor valve;

FIG. 11 is a sectional view taken along the line XI—XI of FIG. 4;

FIG. 12 is a vertical sectional view of a speed shift controller; and

FIG. 13 is a sectional view taken along the line VIII—XIII of FIG. 12;

FIGS. 14 to 24 illustrate a second embodiment of the present invention, wherein

FIG. 14 is a plan view in vertical section of a hydrostatic continuously variable transmission interposed in a power transmitting system for an motorcycle;

FIG. 15 is a back view in vertical section of the transmission;

FIG. 16 is a sectional view taken along the line XVI—XVI of FIG. 15;

FIGS. 17, 18, 19 and 20 are sectional views taken along the lines XVII—XVII, XVIII—XVIII, XIX—XIX and XX—XX of FIG. 15, respectively;

FIG. 21 is a perspective view of a first or second distributor valve;

FIG. 22 is a sectional view taken along the line XXII—XXII of FIG. 15;

FIGS. 23 and 24 are sectional views taken along the lines XXIII—XXIII and XXIV—XXIV of FIG. 15; and FIGS. 25 to 28 illustrate a third embodiment of the present invention, wherein FIG. 25 is a sectional view illustrating a continuously variable transmission similar to those in the fist and second embodiments in a state in which a high pressure oil in a higher pressure oil passage which is to be supplied into cylinder bores of a swash plate type hydraulic motor has been leaked to outside through distributor valves;

FIG. 26 is a view of the whole of the distributor valves; and

FIGS. 27 and 28 are sectional views taken along the lines XXVII—XXVII and XXVIII—XXVIII of FIG. 26.

DESCRIPTION OF THE PREFERRED EMBODIMENTS

The present invention will now be described by way of several embodiments with reference to the accompanying drawings.

Figure 1:
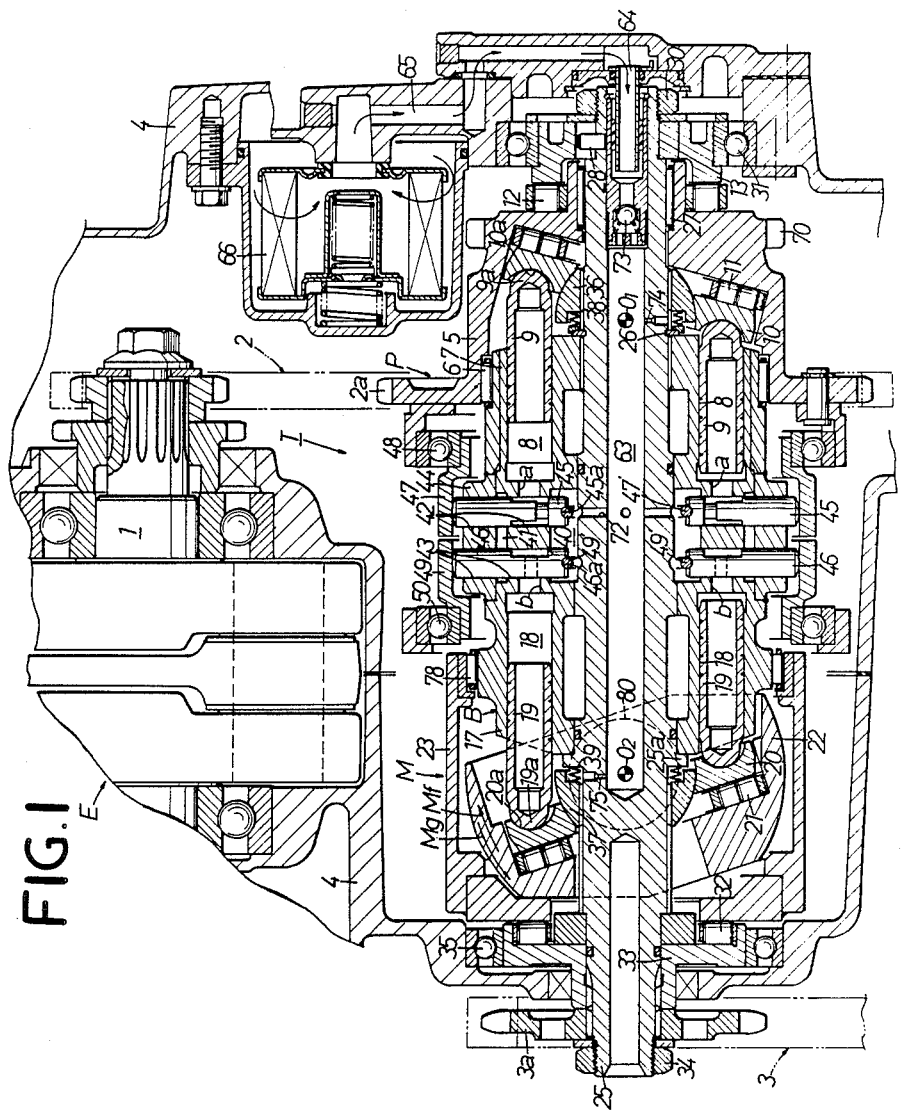

FIG. 1 illustrates a first embodiment in which a swash plate type hydraulic system according to the present invention is applied to a hydrostatic continuously variable transmission for motorcycles.

Figure 2:
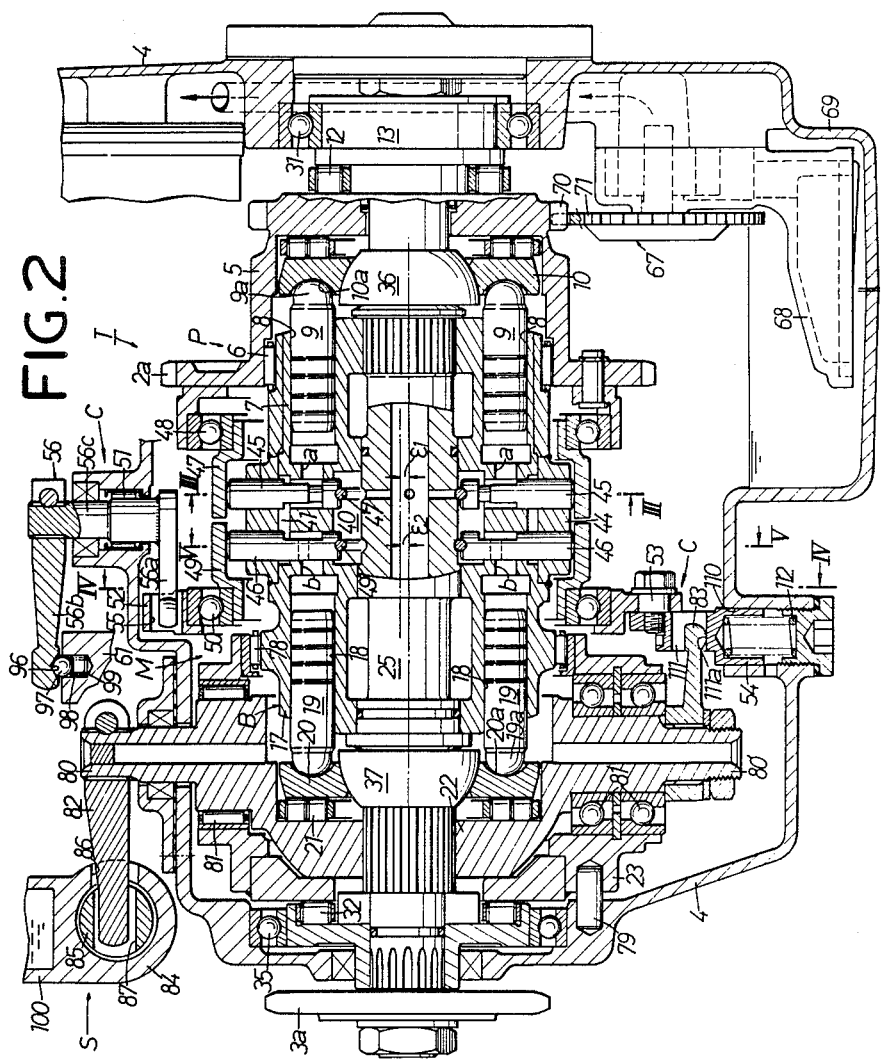

Referring first to FIGS. 1 and 2, a power from an engine E for a motorcycle is transmitted from a crank shaft 1 through a chain type primary decelerator 2, a hydrostatic continuously variable transmission T and a chain type secondary decelerator 3 to a rear wheel which is not shown.

The continuously variable transmission T is comprised of a swash plate type constant volume hydraulic pump P and a swash plate type variable volume hydraulic motor M and is contained in a casing provided by a crank case 4 which supports the crank shaft 1.

The hydraulic pump P comprises a cup-like input member 5 integrally provided with an output sprocket 2a of the primary decelerator 2, a pump cylinder 7 relatively rotatably fitted on the inner peripheral wall of the input member 5 through a needle bearing 6, pump plungers 9, 9—each slidably fitted in each of an odd number of annularly arranged cylinder bores 8, 8— provided in the pump cylinder 7 around the center of rotation thereof, and a pump swash plate 10 abutting against the outer ends of the pump plungers 9.

The pump swash plate 10 is rotatably supported at its back surface on an inner end wall of the input member 5 in an attitude inclined about a phantom trunnion axis 01 perpendicular to the axis of the pump cylinder 7 and at a given angle with respect to the axis of the pump cylinder 7, so that the pump plungers 9, 9—can be permitted to reciprocate during rotation of the input member 5 to repeat suction and discharge strokes.

It is to be noted that a spring for biasing the pump plunger 9 in the extending or projecting direction may be mounted in compression in the cylinder bore 8 to improve a follow-up of the pump plunger 9 relative to the pump swash plate 10.

The input member 5 is supported at its back surface on a support tube 13 through thrust roller bearings 12.

On the other hand, the hydraulic motor M comprises a motor cylinder 17 disposed coaxially with the pump cylinder 7 on the left side thereof, motor plungers 19, 19—each slidably fitted in each of an odd number of annularly arranged cylinder bores 18, 18—provided in the motor cylinder 17 around the center of rotation thereof, a motor swash plate 20 abutting against the outer ends of the motor plungers 19, 19—, a swash plate holer 22 for supporting the back surface of the motor swash plate 20 through thrust roller bearings 21, and a cup-like swash plate anchor 23 for supporting the swash plate holder 22.

The motor swash plate 20 is adapted to tilt between an upright position in which it is perpendicular to the axis of the motor cylinder 17 and an inclined position in which it is inclined at a certain angle, so that when in the inclined position, the motor swash plate 20 can permit the motor plungers 19, 19—to reciprocate with the rotation of the motor cylinder 17 to repeat expansion and retraction strokes.

It is to be noted that a spring for biasing the plunger 19 in the projecting direction may be mounted in compression in the cylinder bore 18 to improve the follow-up of the motor plunger 19 relative to the motor swash plate 20.

The pump cylinder 7 and the motor cylinder 17 constitute an integral cylinder block B, and an output shaft 25 centrally passes through the cylinder block B. The outer end of the motor cylinder 17 is in abutment against a flange 25a integrally formed around the outer periphery of the output shaft 25, and the pump cylinder 7 is spline-fitted over the output shaft 25. Further, a circlip 26 abutting against the outer end of the pump cylinder 7 is locked to the output shaft 25, thus ensuring that the cylinder block B is secured to the output shaft 25.

The output shaft 25 also passes through the input member 5 and rotatably supports the input member 5 through a needle bearing 27.

The support tube 13 is fitted over the outer periphery at the right end of the output shaft 25 through a key 28 and is secured thereto by means of a nut 30. The right end of the output shaft is rotatably supported on the crank case 4 through the support tube 13 and a roller bearing 31.

The output shaft 25 also centrally passes through the motor swash plate 20, the holder 22 and the swash plate anchor 23, and a support tube 33 is spline-fitted over the left end of the output shaft 25 for supporting the back of the swash plate anchor 23 through thrust roller bearings 32. The support tube 33, is secured to the output shaft 25 by the input sprocket 3a of the secondary decelerator 3 and a nut 34. The left end of the output shaft 25 is rotatably supported on the crank case 4 through the support tube 33 and roller bearings 35.

A hemispherical aligner 36 is slidably spline-fitted over the output shaft 25 to engage the inner peripheral surface of the pump swash plate 10 so as to allow tilting of the swash plate 10 with respect to the aligner 36 in all directions. The aligner 36 urges the pump swash plate 10 against the thrust roller bearings 11 by the forces of a plurality of Belleville springs 38 to constantly impart an aligning action to the pump swash plate 10.

A hemispherical aligner 37 is also slidably splinefitted over the output shaft 25 to engage the inner peripheral surface of the motor swash plate 20 so as to allow tilting of the swash plate 20 with respect to the aligner 37 in all directions. The aligner 37 urges the motor swash plate 20 against the thrust roller bearings 21 by the forces of a plurality of Belleville springs 39 to constantly impart an aligning action to the motor swash plate 20.

To strengthen the aligning action of each of the swash plates 10 and 20 and moreover to prevent relative slipping in the rotational direction between the pump swash plate 10 and the group of the pump plungers 9, 9—and between the motor swash plate 20 and the group of the motor swash plungers 19, 19—, spherical recesses 10a, 20a are formed on the swash plates 10, 20 and are engaged by the spherical ends 9a, 19a of the plungers 9, 19. The spherical recesses 10a, 20a each has a radius of curvature set at a value larger than that of the associated spherical end 9a, 19a such that their proper and reliable engagement may be assured at any rotational positions of the swash plates 10, 20.

A hydraulic closed circuit will be formed between the hydraulic pump P and the hydraulic motor M in the following manner.

Provided in the cylinder block B at positions between the group of the cylinder bores 8, 8—of the pump cylinder 7 and the group of the cylinder bores 18, 18—of the motor cylinder 17 are inner and outer annular oil passages 40 and 41 concentrically arranged about the output shaft 25. Further, first and second valve bores 42, 42—and 43, 43—, of the same number as the cylinder bores 8, 8—and 18, 18—, are radially formed to pass through an annular partition wall formed between both the oil passages 40 and 41 and an outer peripheral wall of the outer oil passage 41. A number of pump ports a, a—are provided for permitting the communication of the cylinder bores 8, 8—with the adjacent first valve bores 42, 42—, and a number of motor ports b, b—are provided for permitting communication of the cylinder bores 18, 18—with the adjacent second valve bores 43, 43—. The inner oil passage 40 is defined between the opposed peripheral surfaces of the cylinder block B and the output shaft 25, while the outer oil passage 41 is defined between the opposed peripheral surfaces of the cylinder block B and a sleeve 44 fitted over and welded to the outer periphery of the cylinder block B. It is noted that the inner and outer oil passages 40 and 41 correspond respectively to lower and higher pressure oil passages of the present invention.

First and second distributor valves 45, 45—and 46, 46—are slidably fitted in the first and second valve bores 42, 42—and 43, 43—, respectively.

Figure 9:
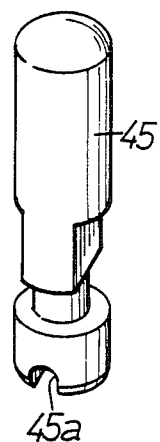

Each of the first distributor valves 45 is formed into a spool type as shown in FIG. 9, and at its radially outer position in the first valve bore 42, it permits the corresponding pump port a to communicate with the outer oil passage 41, while simultaneously cutting communication of that port with the inner oil passage 40, thereby putting the associated cylinder bore 8 into communication with only the outer oil passage 41. When assuming a radially inner position in the first valve bore 42, the first distributor valve 45 permits the corresponding pump port a to communicate with the inner oil passage 40, while at the same time cutting off communication that port with the outer oil passage 41, thereby bringing the associated cylinder bore 8 into communication with only the inner oil passage 41.

Figure 3:
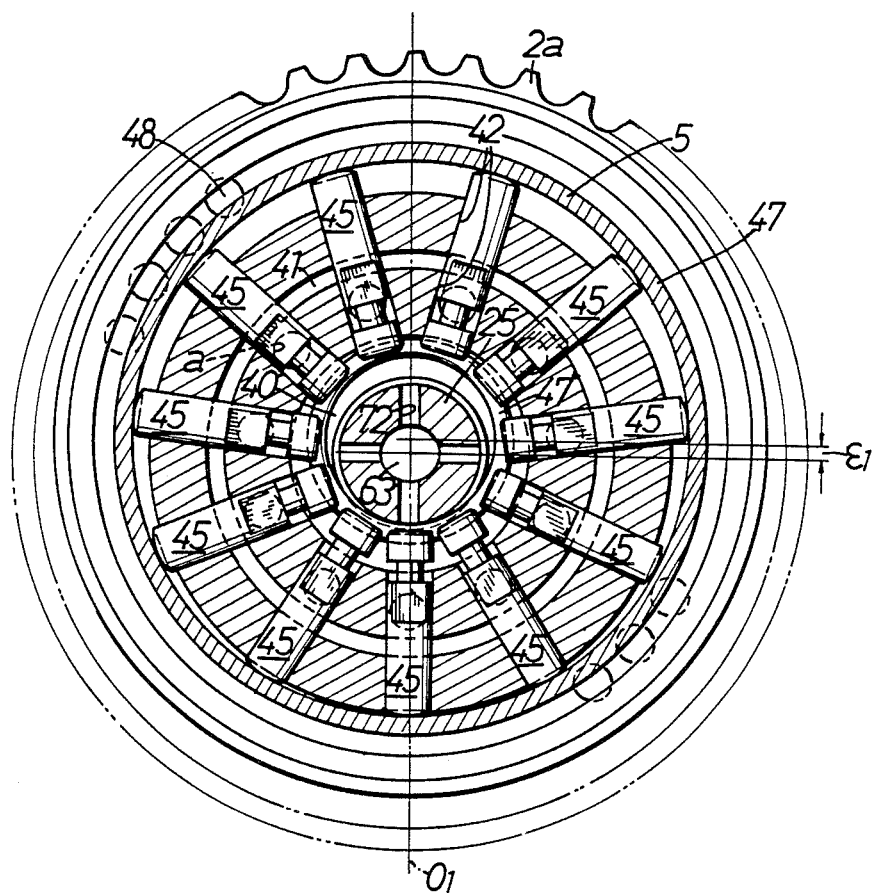

To provide such a radially shifting motion for each distributor valve 45, a first eccentric wheel 47 as a distributor valve first driving means, surrounds the group of the first distributor valves 45, 45—and engages the outer ends thereof, and a follower wheel 47' is disposed inside the group of the first distributor valves 45, 45—in a concentrical relation to the eccentric wheel 47 and engages grooves 45a, 45a the inner ends of the first distributor valves (see FIG. 3). The follower wheel 47' is formed from a steel wire and urges resiliently urge the first distributor valves 45, 45—toward engagement with the first eccentric wheel 47. It is noted that a single cut may be provided in the follower wheel 47' to absorb a production error in diameter.

The first eccentric wheel 47 is rotatably supported on the input member 5 through ball bearings 48 and disposed in a position eccentric by a given distance $\epsilon 1$ from the center of the output shaft 25 along the phantom trunnion axis 01 of the pump swash plate 20. Thus, if relative rotation occurs between the input member 5 and the pump cylinder 7, each first distributor valve 45 reciprocates within the valve bore thereof between the aforesaid outer and inner positions in a stroke of a distance two times the eccentric amount $\epsilon 1$ of the first eccentric wheel 47.

Each of the second distributor valves 46 is formed into spool type. At a radially outer position in the second valve bore 43, the second distributor valve 46 permits the corresponding motor port b to communicate with the outer oil passage 41 while simultaneously cutting off the communication of such port with the inner oil passage 40, thereby bringing the corresponding cylinder bore 18 into communication with only the outer oil passage 41, whereas at a radially inner position, the second distributor valve 46 permits the corresponding motor port b to communicate with the inner oil passage 40 while at the same time cutting off the communication of such pont with the outer oil passage 41, thereby bringing the corresponding cylinder bore 18 into communication with only the inner oil passage 40. Further, at a central position between the aforesaid radially outer and radially inner positions, the second distributor valve 46 brings the corresponding motor port b out of communication with either of the inner and outer oil passages 40 and 41.

Figure 5:
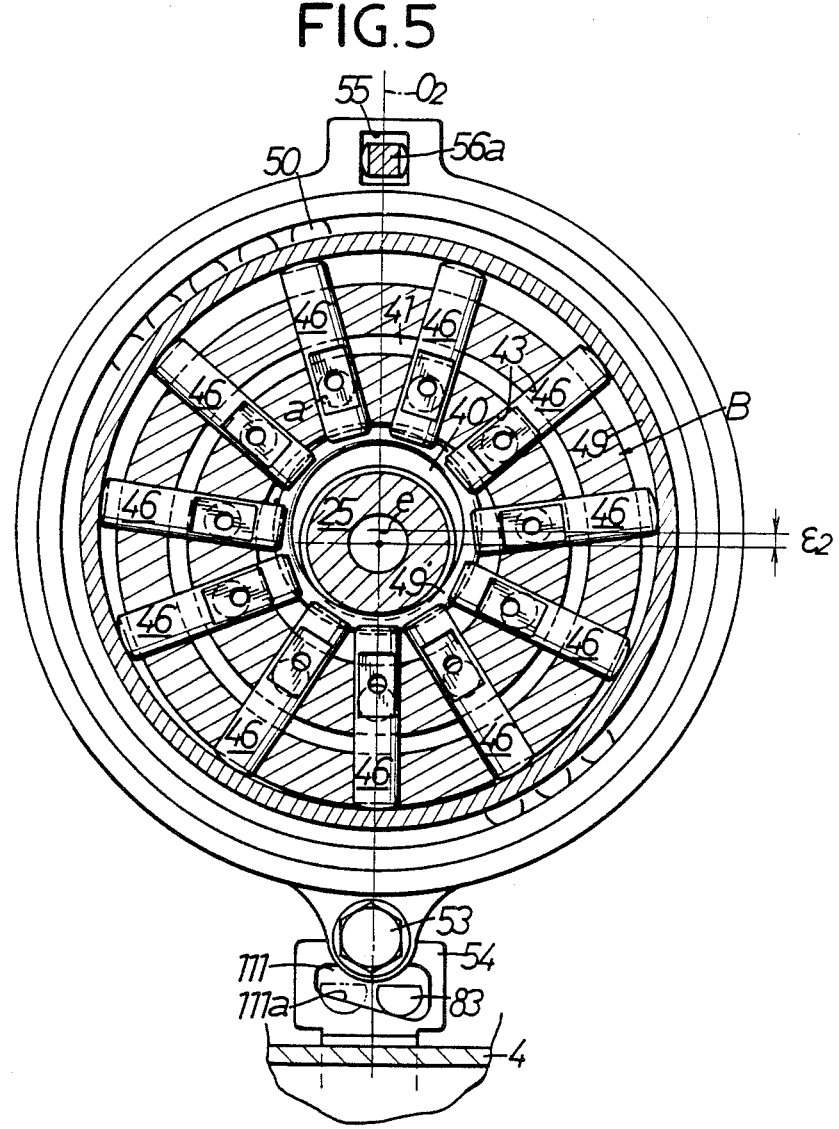
Figure 10:
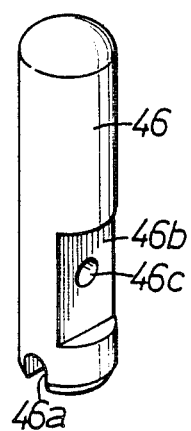
Figure 11:
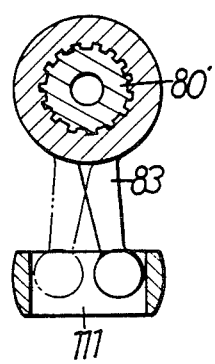

The second distributor valve 46 has a notch 46b made by cutting away one side of the outer peripheral surface, as shown in FIGS. 5 and 10 and a transverse hole 46c for normally permitting the communication of the interior of the notch 46b with the motor port b. The communication and discommunication between the motor port b and the inner and outer oil passages 40 and 41 through the valve 46 depend upon whether the notch 46b either faces the inner or outer oil passage 40 or 41, or is hidden within the partition wall between both and oil passages 40 and 41.

To provide such a radially shifting motion to each second distributor valve 46, a second eccentric wheel 49, as a distributor valve second driving means, surrounds the group of the second distributor valves 46, 46—and engages the outer ends thereof, and a follower wheel 49' is disposed inside the group of the second distributor valves 46, 46—in a concentric relation to the eccentric wheel 49 to engage grooves 46a, 46a—formed in the inner ends of the second distributor valves, this engagement inhibiting the rotation of each second distributor valve 46 in the second valve bore 43 (see FIG. 5). The follower wheel 49' is formed from a steel wire and disposed to resiliently urge the second distributor valves 46, 46—toward the engagement with the second eccentric wheel 49. It is to be understood that a single cut may be also provided in the follower wheel 49' as in the above-described follower wheel 47'.

Figure 4:
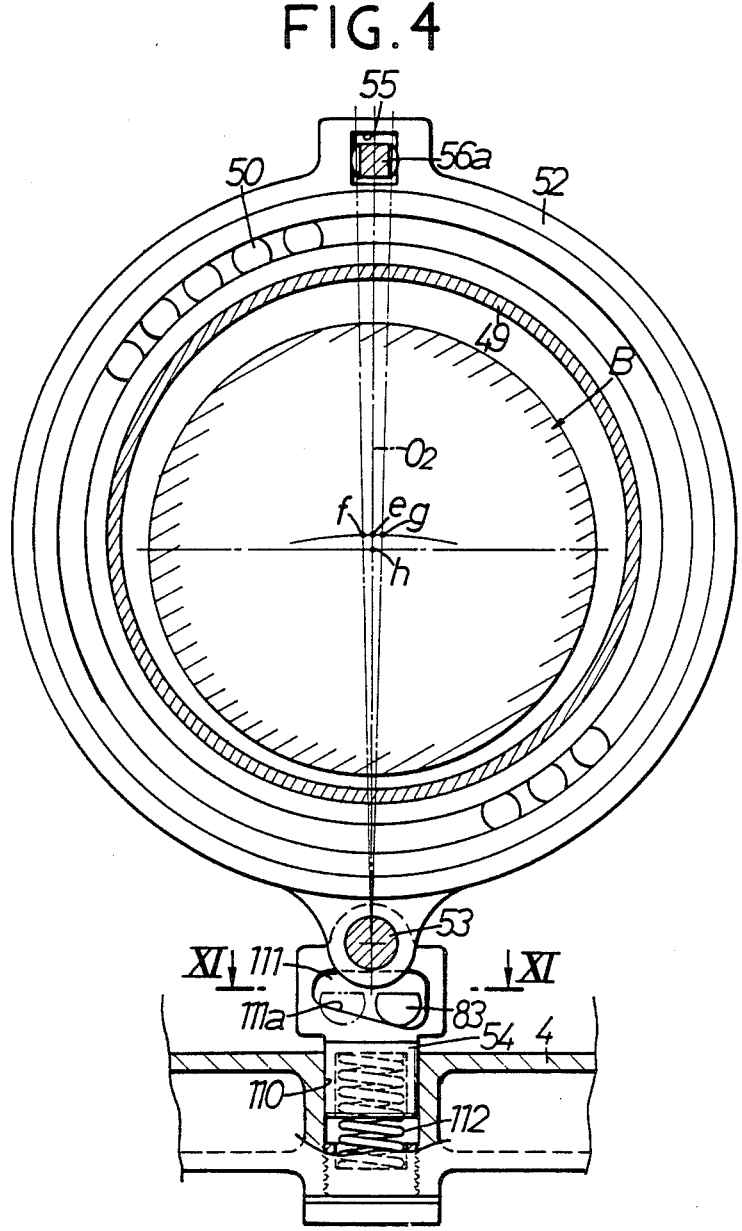

The second eccentric wheel 49 is controllable, as shown in FIGS. 4 and 5, to a first eccentric position e eccentric by a given distance $\epsilon_2$ from the center of the output shaft 25 along the tilting aixs or trunnion axis 02 of the motor swash plate 20, a second eccentric position f slightly deviated in center from the first position e to one side of the trunnion axis 02, a third eccentric position g slightly deviated in center from the first position e to the other side of the trunnion axis 02, and a position h concentric with the output shaft 25.

Thus, when the second eccentric wheel 49 assumes any of the first to third eccentric positions e to g, each second distributor valve 46, as the motor cylinder 17 is rotated, reciprocates within the valve bore 43 thereof between the aforesaid outer and inner positions in a stroke of a distance two times an eccentric amount $\epsilon_2$ of the second eccentric wheel 49, and when the second eccentric wheel 49 assumes the concentric position h, all the second distributor valves 49, 49—are arrested in the above-described central position despite the rotation of the motor cylinder 17.

As shown in FIG. 2, a pair of upper and lower trunnion shafts 80 and 80' arranged on the trunnion axis 02 of the motor swash plate 20 are integrally provided respectively on the opposite ends of the swash plate holder 22 and rotatably supported on the swash plate anchor 23 respectively through a needle bearing 81 and roller bearings 81'. In other words, the trunnion axis 02 is defined by the trunnion shafts 80 and 80'.

The swash plate anchor 23 is supported through needle bearings 78 on the outer periphery of the motor cylinder 17 and connected through a single positioning pin 79, or a pair of positioning pins 79, to the crank case 4 against the rotation about the output shaft 25.

In the above arrangement, when the second eccentric wheel 49 assumes the first eccentric position e, the rotation of the input member 5 of the hydraulic pump P from the primary decelerator 2 causes the pump swash plate 10 to alternately impart the suction and discharge strokes to the pump plungers 9, 9—, so that the first distributor valve 45 adjacent to the pump plunger 9 entering the suction stroke is moved to the inner position in cooperation of the first eccentric wheel 47 with the follower wheel 47', while the first distributor valve 45 adjacent to the pump plunger 9 entering the discharge stroke is moved to the outer position in cooperation of the first eccentric wheel 47 with the follower wheel 47'. Thus, each pump plunger 9 draws a working oil from the inner oil passage 40 into the cylinder bore 8 in the suction stroke and pumps the working oil from the cylinder bore 8 into the outer oil passage 41 in the discharge stroke.

The high pressure working oil passed into the outer oil passage 41 is supplied into that cylinder bore 18 which accommodates therein plunger 19 entering its expansion stroke, through the second distributor valve 46 which has then moved to the radially outer position by the second eccentric wheel 49 and the follower wheel 49', while the working oil in the cylinder bore 18 which accommodates the motor plunger 19 entering its retraction stroke is discharged into the inner oil passage 40 through the second distributor valve 46 having moved to the radially inner position by the second eccentric wheel 49 and the follower wheel 49'.

Through this operation, the cylinder block B is caused to rotate by the sum of a reaction torque received by the pump cylinder 7 from the pump swash plate 10 through the pump plungers 9 which are in the discharge stroke and a reaction torque received by the motor cylinder 17 from the motor swash plate 20 through the motor plungers 19 which are in the expansion stroke. That rotational torque is transmitted from the output 25 to the secondary decelerator 3.

In this case, the speed ratio of the output shaft 25 to the input member 5 is given by the following equation:

$$\text{Speed ratio} = 1 + \frac{\text{Volume of the hydraulic motor } M}{\text{Volume of the hydraulic pump } P}$$

Accordingly, the speed ratio can be varied from 1 to a certain required value if the volume of the hydraulic motor M is changed from zero to a certain value.

Because the volume of the hydraulic motor M is determined by the stroke of the motor plunger 19, the speed ratio can be continuously controlled from 1 to a certain value by providing the tilting displacement of the motor swash plate 20 from the upright position to a certain inclined position.

During such a operation of the hydraulic pump P and the hydraulic motor M, the pump swash plate 10 receives a thrust load from the group of the pump plungers 9, 9—, while the motor swash plate 20 receives an thrust load from the group of the motor plungers 19, 19—, these thrust loads being in directions reverse to each other, but the thrust load received by the pump swash plate 10 is carried by the output shaft 25 through the thrust roller bearings 11, the input member 5, the thrust roller bearings 12, the support tube 13 and the nut 30, whilst the thrust load received by the motor swash plate 20 is simiarly carried by the output shaft 25 through the thrust roller bearings 21, the swash plate holder 22, the swash plate anchor 23, the thrust roller bearings 32, the support tube 33, the sprocket 3a and the nut 34. Therefore, the thrust loads merely cause the output shaft 25 to produce a tensile stress, and will not act on the crank case 4 supporting the output shaft 25 at all.

Figure 5A:
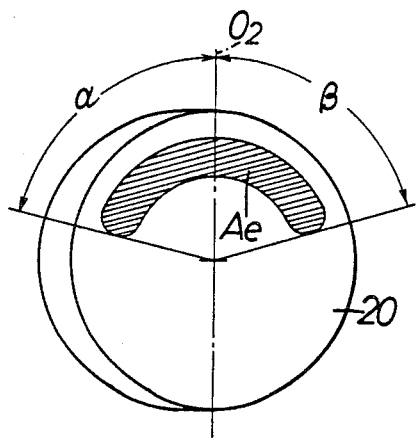
FIGS. 5A, 6A, and 7A are diagrams illustrating the distributions of thrust loads from motor plungers in states shown in FIGS. 5 to 7.
Figure 6A:
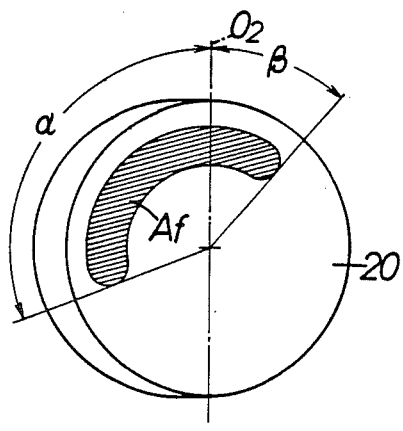
Figure 6:
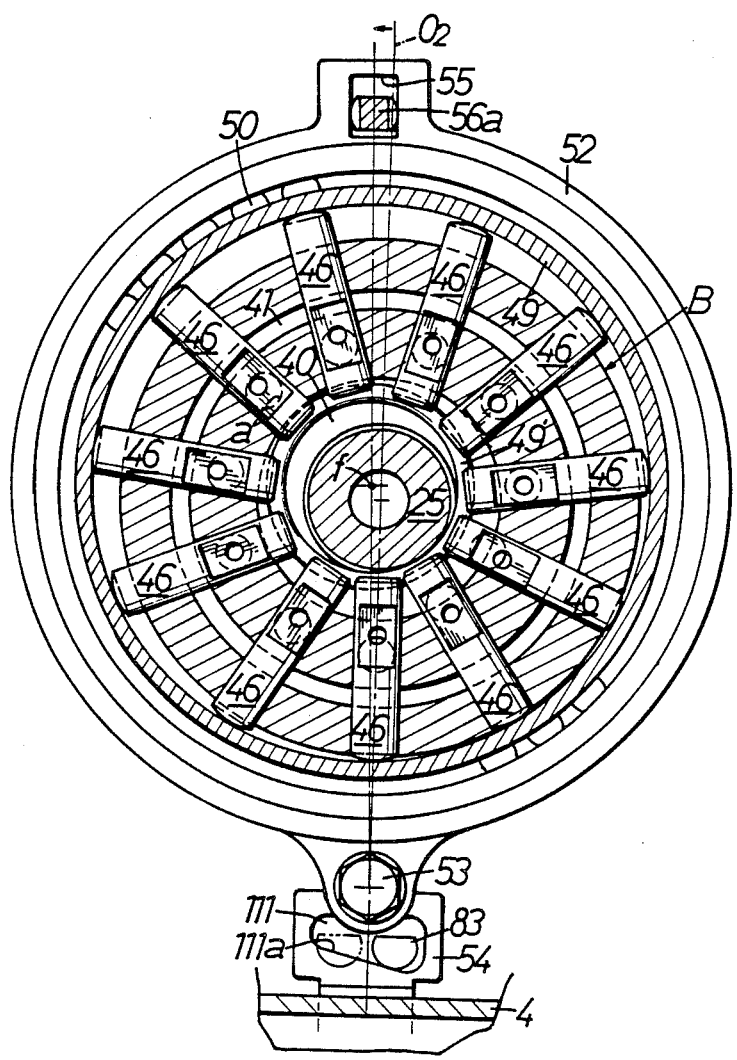

When the second eccentric wheel 49 assumes the first eccentric position e, some of the second distributor valves 46, 46—which permit the high pressure outer oil passage 41 to communicate with the motor ports b are located averagely in the same number on the opposite sides of the trunnion axis 02, as shown in FIG. 5 and hence, distribution of thrust load exerted on the motor swash plate 20 by the motor plungers 19, 19—in the expansion stroke is averagely balanced equally on the opposite sides of the trunnion axis 02 as indicated by Ae in FIG. 5A (i.e., $\alpha=\beta$). Thus, with such a thrust load distribution, a tilting moment around the trunnion axis 02 is not produced in the motor swash plate 20. When the second eccentric wheel 46 assumes the second eccentric position f, however, the amount of each second distributor valve 46 protruding radially outwardly from the cylinder block B is different from the amount of protrusion of that second distributor valve 46, which is located at the same angle in the first eccentric position e. That is, of the second distributor valves 46, 46—which permit the higher pressure outer oil passage 41 to communicate with the motor ports b, the number of those which are located on the left side of the trunnion axis 02 is larger than the number of those located on the right side, as shown in FIG. 6. For this reason, distribution of the thrust load exerted on the motor swash plate 20 by the motor plungers 19, 19—in their expansion stroke is wider on the left side of the trunnion axis 02 than on the right side (i.e., $\alpha > \beta$), as indicated by Af in FIG. 6A. Therefore, a standing-up moment Mf (see FIG. 1) around the trunnion axis 02 acts on the motor swash plate 20 to turn it in the standing-up direction.

Figure 7A:
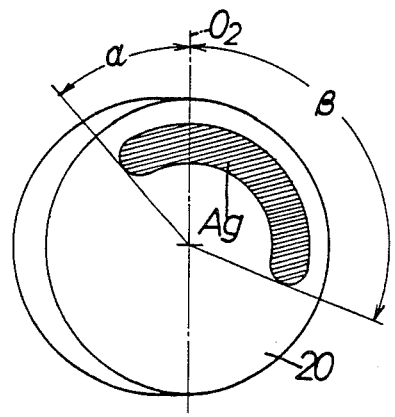
Figure 7:
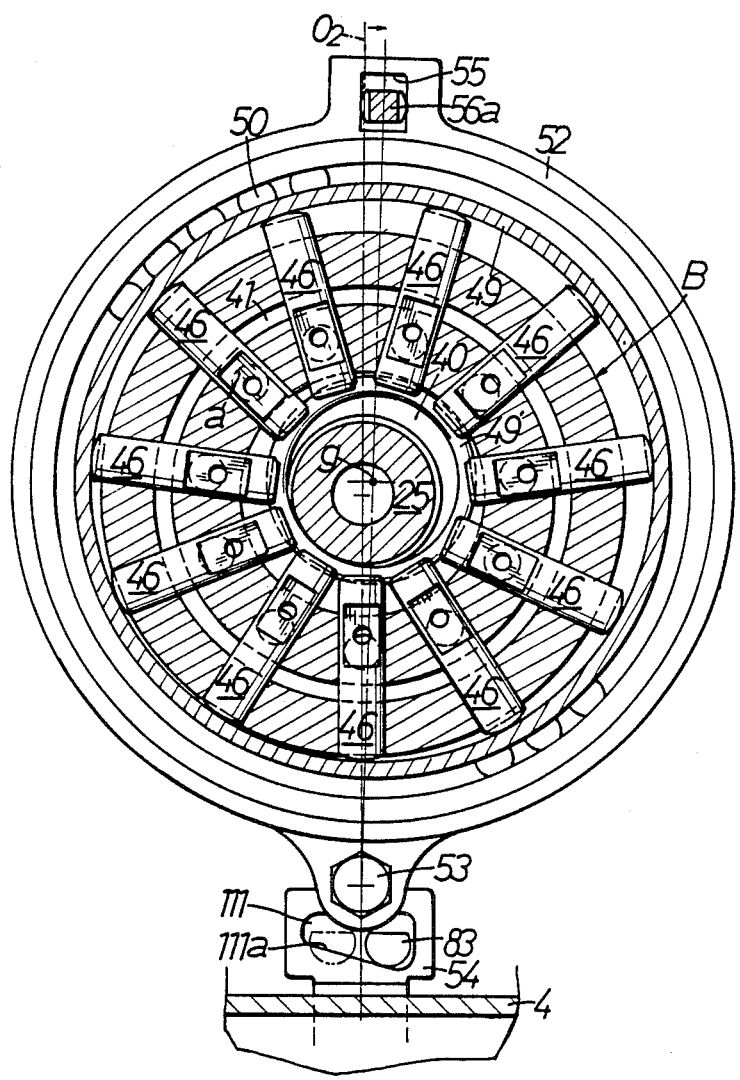

Contrarily, when the second eccentric wheel 49 assumes the third eccentric position g, of the second distributor valves 46, 46—which permit the higher pressure outer oil passage 41 to communicate with the motor ports b, the number of those which are located on the right side of the trunnion axis 02 is larger than the number of those located on the left side, as shown in FIG. 7. Hence, distribution of thrust load exerted on the motor swash plate 20 by the motor plungers 19, 19—in their expansion stroke is wider on the right side of the trunnion axis 02 than on the left side (i.e., $\alpha < \beta$), as indicated by Ag in FIG. 7A. Therefore, a tilting moment Mg (see FIG. 1) around the trunnion axis 02 acts on the motor swash plate 20 to tilt it down.

To control the second eccentric wheel 49 to any of the first to third eccentric positions e to g, a transmission control device C which constitutes a shifting device according to the present invention and which will be descirbed hereinbelow is connected to the second eccentric wheel 49.

Referring to FIGS. 2 and 5, the second eccentric wheel 49 is rotatably borne through ball bearings 50 on an operating ring 52 which is supported at its lower portion on a support member 54 through a pivot 53 disposed perpendicularly to the trunnion axis 02 in such a manner to swing the second eccentric wheel 49 to the second eccentric position f or the third eccentric position g.

Provided in the upper portion of the operating ring 52 is a connecting hole 55 in which is engaged a bell crank 56 for swinging the second eccentric wheel 49 about the pivot 53 to any of the first to third eccentric positions e to g. The bell crank 56 is comprised, as shown in FIG. 2, of a turning shaft 56c supported on the crank case 4 through bearings 51, an inner lever 56a secured to the turning shaft 56c within the crank case 4, and an outer lever 56b secured to the turning shaft 56c outside the crank case 4, the fore end of the inner lever 56a being inserted in the connecting hole 55.

Figure 12:
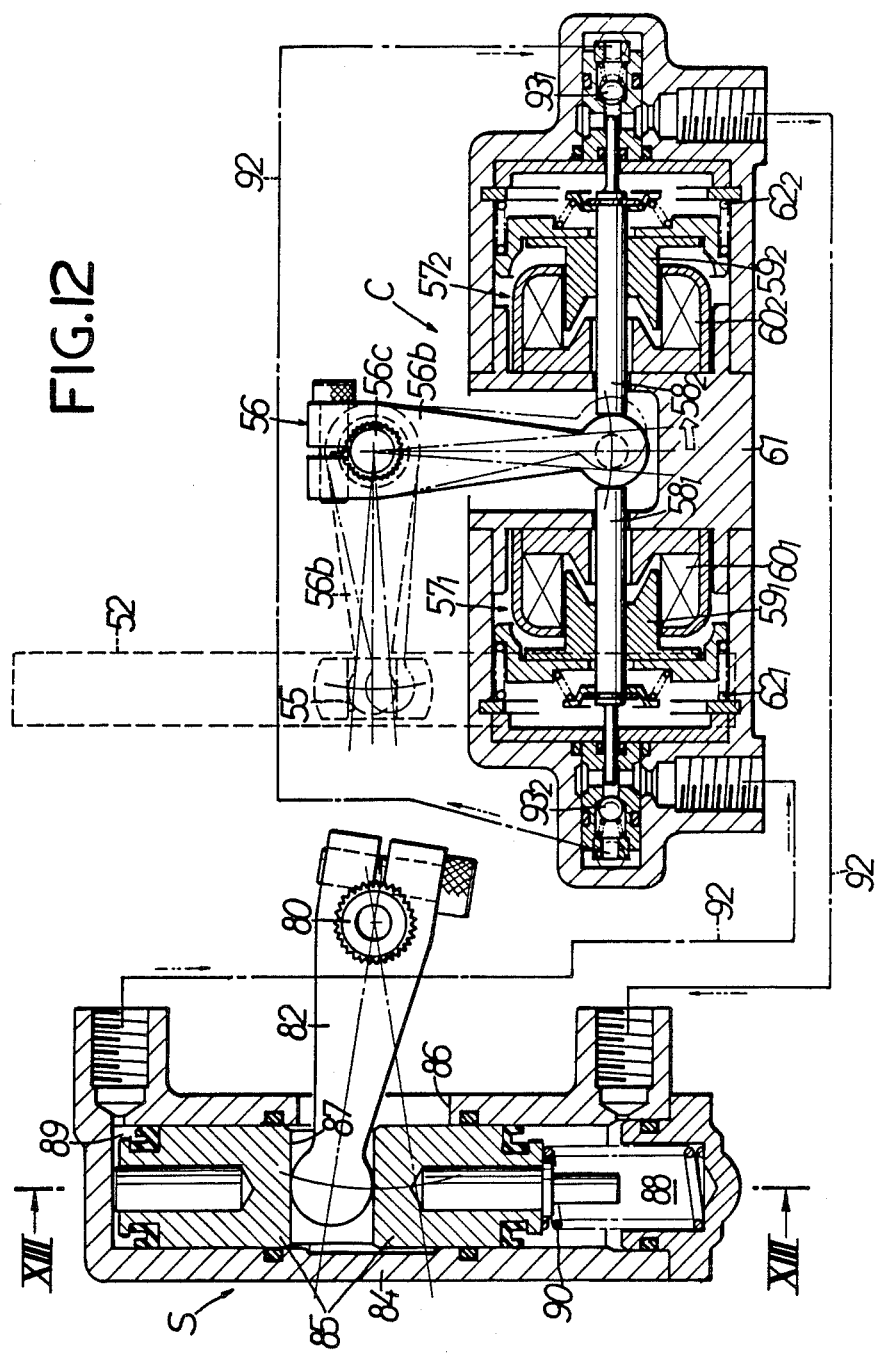

Actuator rods $58_1$ and $58_2$ of a pair of first and second opposed solenoid actuators $57_1$ and $57_2$ are connected to the fore end of the outer lever 56b to clamp the latter, as shown in FIG. 12, and the first and second solenoid actuators $57_1$, $57_2$ respectively comprise movable iron cores $59_1$, $59_2$ fixedly mounted on the actuator rods $58_1$, $58_2$, solenoids $60_1$, $60_2$ surrounding the movable iron cores $59_1$, $59_2$, a common actuator body 61 carrying both the solenoids $60_1$, $60_2$, and return springs $62_1$, $62_2$ for biasing the movable iron cores $59_1$, $59_2$ toward the outer lever 56b, i.e., toward a non-operative position, the actuator body 61 being secured in place to the crank case 4.

In a condition that the solenoids $60_1$ and $60_2$ of the solenoid actuators $57_1$ and $57_2$ both have been deenergized, both the actuator rods $58_1$ and $58_2$ hold the bell crank 56 in a neutral position by the cooperation of both the return springs $62_1$ and $62_2$, whereby the second eccentric wheel 49 can be controlled through the operating ring 52 into the first eccentric position e. If only the solenoid $60_1$ or $60_2$ of the first or second actuator $57_1$ or $57_2$ is energized, the forward movement of the corresponding actuator rod $58_1$ or $58_2$ to the outer lever 56b causes the bell crank 56 to be swung from the neutral position in the counterclockwise or clockwise direction in FIG. 5, whereby the second eccentric wheel 49 can be controlled through the operating ring 52 into the third or second eccentric position g or f. In this case, with the second or first actuator $57_2$ or $57_1$ deenergized, its actuator rods is further retreated from the normal non-operative position with the swinging movement of the bell crank 56.

In order to hold the bell crank 56 reliably at the neutral position, a ball 97, which is contained in a hole 99 in the actuator body 61 and biased by a spring 98, is resiliently engaged with a positioning notch 96 made in the lower surface of the outer lever 56c.

A swash plate stabilizer S is connected to the upper trunnion shaft 80. The swash plate stabilizer S includes a cylinder 84 secured in place to the crank case 4, and a piston 85 slidably received in the cylinder 84. A window 86 is made in a side wall of the cylinder 84, while a connecting hole 87 is perforated in the piston 85 at a central portion thereof so as to pass transversely therethrough and face the window 86. A first control lever 82 secured to the trunnion shaft 80 is passed through the window 86 to engage the connecting hole 87, so that the piston 85 may be permitted to slide in the cylinder 84 in response to the rotation of the trunnion shaft 80.

In FIG. 12, maximum inclined and upright positions of the motor swash plate 20 are determined by the upper and lower limits of sliding movement of the piston 85. A first oil chamber 88 is defined between the piston 85 and a lower end wall of the cylinder 84, while a second oil chamber 89 is defined between the piston 85 and an upper end wall of the cylinder 84, and a spring 90 is mounted in compression in the first oil chamber 88 fo biasing the piston 85 toward the second oil chamber 89.

The first and second oil chambers 88 and 89 are in communication with each other through a hydraulic conduit 92 filled with an oil, and first and second check valves $93_1$ and $93_2$ are interposed in series on the way of the hydraulic conduit 92.

The first check valve $93_1$ is adapted to permit the oil to flow through the hydraulic conduit 92 from the first oil chamber 88 toward the second oil chamber 89 and to block the reverse flow. The second check valve $93_2$ is adapted to permit the oil to flow from the second oil chamber 89 toward the first oil chamber 88 and to block the reverse flow. Moreover, the first check valve $93_1$ is disposed at one end of the actuator body 64 in such a manner to be forcedly opened by the further retreating movement of the actuator rod $58_2$ of the second solenoid actuator $57_2$ from the normal non-operative position, while the second check valve $93_2$ is disposed at the other end of the actuator body 64 in such a manner to be forcedly opened by the further retreating movement of the actuator rod $58_1$ of the first solenoid actuator $57_1$ from the normal non-operative position.

Thus, if only the first solenoid actuator $57_1$ is energized as described above to tilt down the motor swash plate 20, the first check valve $93_1$ is forcedly opened by the retreating movement, with advancing movement of the other actuator rod $58_1$, thereof, of the other actuator rod $58_2$, so that the piston 85 is moved up together with the tilting movement of the motor swash plate 20 in response to passage of the oil in the second oil chamber 89 via the hydraulic conduit 92 into the first oil chamber 88 (see FIG. 12), whereby the tilt-down movement of the motor swash plate 20 is permitted. Conversely, if only the second actuator $57_2$ is energized as described above to stand up the motor swash plate 20, then the second chack valve $93_2$ is forcedly opened, so that the piston 85 is moved down in response to passage of the oil in the first oil chamber 88 via the hydraulic conduit 92 into the second oil chamber 89, whereby the standing-up movement of the plate 20 is permitted.

During such a tilting or standing-up movement of the motor swash plate 20, if the moment Mg, Mf acting on the motor swash plate 20 from the motor plungers 19, 19—is pulsated to act on the motor swash plate 20 for vibration, such vibration of the motor swash plate 20 is inhibited by the flow of the oil in the hydraulic conduit 92 being restricted in one direction only by the second or first check valve $93_2$ or $93_1$ in the closed state, thus ensuring that the standing-up or tilting movement of the motor swash plate 20 can be stabilized.

In addition, if the solenoid actuators $57_1$ and $57_2$ both are deenergized as described above to hold the motor swash plate 20 in any angular position, both the check valves $93_1$ and $93_2$ are closed to interrupt the hydraulic conduit 92, so that the flow of the oil in the hydraulic conduit 92 is blocked to keep the piston 85 from moving and as a result, the first control lever 82 of the trunnion shaft 80 is brought into a stationary state. In this manner, the motor swash plate 20 is stably held in any angular position and cannot be vibrated even upon reception of a pulsative moment from the groups of the motor plungers, 19, 19—.

Figure 13:
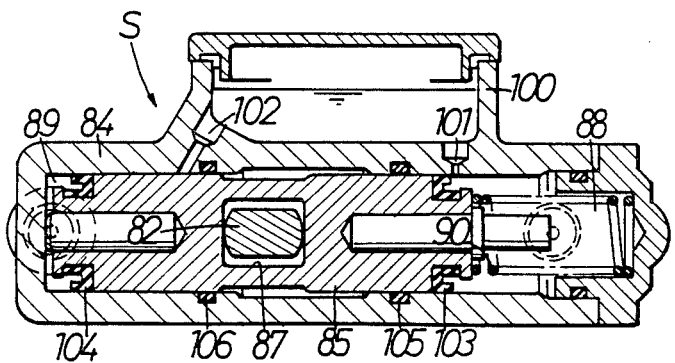

Referring to FIG. 13, a reservoir tank 100 is equipped on the upper portion of the cylinder 84, and a relief port 101 and a supply port 102 are opened through the upper wall of the cylinder 84 for permitting the reservoir tank 100 to communicate with the interior of the cylinder 84.

First and second cap seals 103 and 104 each having a unidirectional sealing function to seal the inner peripheral surface of the cylinder 84 are mounted around the outer periphery at the opposite ends of the piston 85, and O-rings 105 and 106 are mounted around the inner periphery of the cylinder 84 in close contact with the outer peripheral surface at intermediate portions of the piston 85 on the laterally opposite sides of the window 86.

The relief port 101, when the piston 85 is located at the left movement limit shown in FIG. 13 (the upper movement limit shown in FIG. 12), is opened into the first oil chamber 88 just in front of the first cap seal 103, and the supply port 102 is always opened to the inner surface of the cylinder 84 between the second cap seal 104 and the O-ring 106.

Thus, when the piston 85 is located at the left movement limit and an increase in pressure occurs in the first oil chamber 88 due to an increase in oil temperature or the like, that pressure is released through the relief port 101 into the reservoir tank 100. In addition, during movement of the piston 85 to the right side, the first oil chamber 88 is pressurized by the piston 85 from the point when the first cap seal 103 has passed the opening of the relief port 101 to enable the oil to flow from the first oil chamber 88 into the second oil chamber 89. In this case, if the second oil chamber 89 is depressurized below a predetermined pressure, a difference in pressure between the interior of the reservoir tank 100 and the second oil chamber 89 causes the oil in the reservoir tank 100 to be supplemented through the slide clearance between the cylinder 84 and the piston 85 into the second oil chamber 89 while flexing the second cap seal 104 toward the second oil chamber 89.

Referring again to FIG. 4, the support member 54 which supports the operating ring 52 of the second eccentric wheel 49 through the pivot 53 is fitted in a support hole 110 provided in the crank case 4 for sliding movement therein parallel to the trunnion axis 02, and the inner lever 56a of the bell crank 56 is slidable in the connecting hole 55 in the operating ring 52 in the direction of the trunnion axis 02 in order to move the operating ring 52 to follow the sliding movement of the support member 54.

Provided in the support member 54 is a cam hole 111 in which is inserted the second control lever 83 secured to the lower trunnion shaft 80'. That inner surface of the cam hole 111, which is closer to the support hole 110, is formed as an inclined surface 111a which is engaged and pressed by the second control lever 83 interlockingly with the standing-up movement of the motor swash plate 20. This pressing motion causes the support member 54 to slide in the support hole 110 to displace the second eccentric wheel 49 through the operating ring 52 toward the concentric position h, so that the second eccentric wheel 49 reaches the concentric position h when the motor swash plate 20 assumes the upright state.

Figure 8:
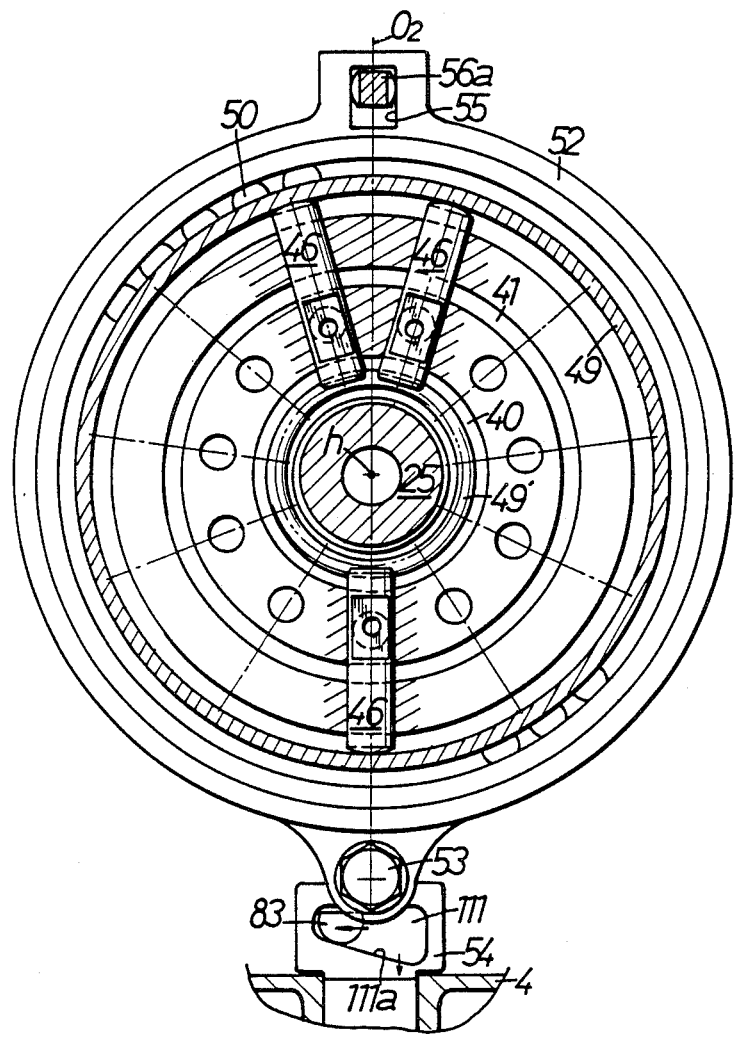

When the second eccentric wheel 49 has reached the concentric position h, all the second distributor valves 46, 46—are closed as shown in FIG. 8 so that both the higher and lower pressure oil passages 41 and 40 are cut off from their communication with the hydraulic motor M. As a result, the volume of a low pressure circuit communicating with the hydraulic pump P decreases by an amount corresponding to the volume of the hydraulic motor M and hence, even if some bubbles are contained in the working oil, the amount of working oil compressed by the hydraulic pump P is extremely small so that the relative rotation between the input member 5 and the output shaft 25 can be suppressed to an extremely low level, i.e., the transmitting efficiency can be enhanced when a speed ratio is of 1. Accordingly, when the motor swash plate 20 is in the upright position, each of the second distributor valves 46, 46—functions as a lock-up valve to cut off the communication between the lower and higher pressure oil passages 40 and 41.

In this case, the displacement of the second eccentric wheel 49 to the concentric position h, in the illustrated embodiment, is continuously, steplessly affected interlockingly with the standing-up movement of the motor swash plate 20 by the action of the inclined surface 111a of the cam hole 111 and hence, each of the second distributor valves 46, 46—also continuously performs its own action while gradually reducing the reciprocating stroke thereof and ultimately attains the closed state. Accordingly, a transmitting shock can be prevented from generating during such valve closing operation, because the transmitting efficiency slowly begins to increase prior to attainment of the closed state. However, when the extent of such transmitting shock is as low as acceptable, the second distributor valves 46, 46—may be closed rapidly when the motor swash plate 20 is moved to its upright position.

A return spring 112 is mounted in compression in the support hole 110 for resiliently urging the support member 54 toward the first eccentric wheel 49. Therefore, when the motor swash plate 20 is in an inclined state, the second eccentric wheel 49 is held in the first eccentric position e by the resilient force of the return spring 112 and can provide the usual reciprocation to the distributor valves 46, 46—.

Referring again to FIGS. 1 and 2, the output shaft 25 has a blind oil passage 63 made at a central portion thereof, and an oil feed pipe 64 supported on the side wall of the crank case 4 is inserted in an opened end of the oil passage 63. The oil feed pipe 64 is in communication with the interior of an oil pan 69 provided at the bottom of the crank case 4 through an oil passage 65 defined in the side wall of the crank case 4, a filter 66 attached to that side wall, a supplement pump 67 and a strainer 68. The supplement pump 67 is driven from the input member 5 through gears 70 and 71. Therefore, during rotation of the input member 5, the oil in the oil pan 69 is constantly supplied into the oil passage 63 by the supplement pump 67.

The oil passage 63 is in communication with the inner oil passage 40 through a radial supplement hole 72 made in the output shaft 25. A check valve 73 is interposed in the oil passage 63 to prevent the reverse flow of the oil toward the oil feed pipe 64.

Thus, if there is a leakage of the working oil from the hydraulic closed circuit between the hydraulic pump P and the hydraulic motor M during a normal load operation, the working oil is supplemented from the oil passage 63 through the supplement hole 72 into the inner oil passage 40.

During a reverse load operation, i.e., during engine braking, the hydraulic motor M performs a pump action, while the hydraulic pump P performs a motor action, so that the outer oil passage 41 is at a lower pressure and the inner oil passage 40 is at a higher pressure. In this case, the working oil is intended to reversely flow from the inner oil passage 40 into the oil passage 63, but occurrence of such reverse flow is prevented by the check valve 73. Therefore, the reverse load can be reliably transmitted from the hydraulic motor M to the hydraulic pump P to provide a good engine braking effect.

It is noted that each of the reference numerals 74 and 75 in FIG. 1 denotes an orifice perforated in the output shaft 25 to supply a lubricating oil from the oil passage 63 to each of the abutment portions between the plungers 9 and 19 and the swash plates 10 and 20.

FIGS. 14 to 24 illustrate a second embodiment in which a swash plate type hydraulic system according to the present invention is applied to a hydrostatic continuously variable transmission for a motorcycle as in the first embodiment. In this second embodiment, the parts corresponding to those in the first embodiment are designated by the same reference numerals and characters.

A chain type primary decelerator 2, which receives a power from an engine E through a crank shaft 1, has an output sprocket 202a which is connected by a plurality of (three in the illustrated embodiment) rivets 214 to a cup-like input member 205 of a hydraulic pump P.

The swash plate type hydraulic pump P is of a constant volume type, and a swash plate type hydraulic motor M is of a variable volume type, which pump P and motor M constitute a continuously variable transmission T.

Figure 21:
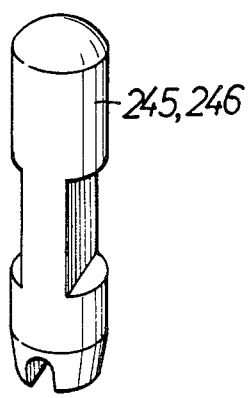

A hydraulic closed circuit formed between the hydraulic pump P and the hydraulic motor M is basically of the same construction as that in the first embodiment, except that first distributor valves 245, 245—slidably fitted in first valve bores 42, 42—are formed into such as spool type as shown in FIG. 21.

Figure 16:
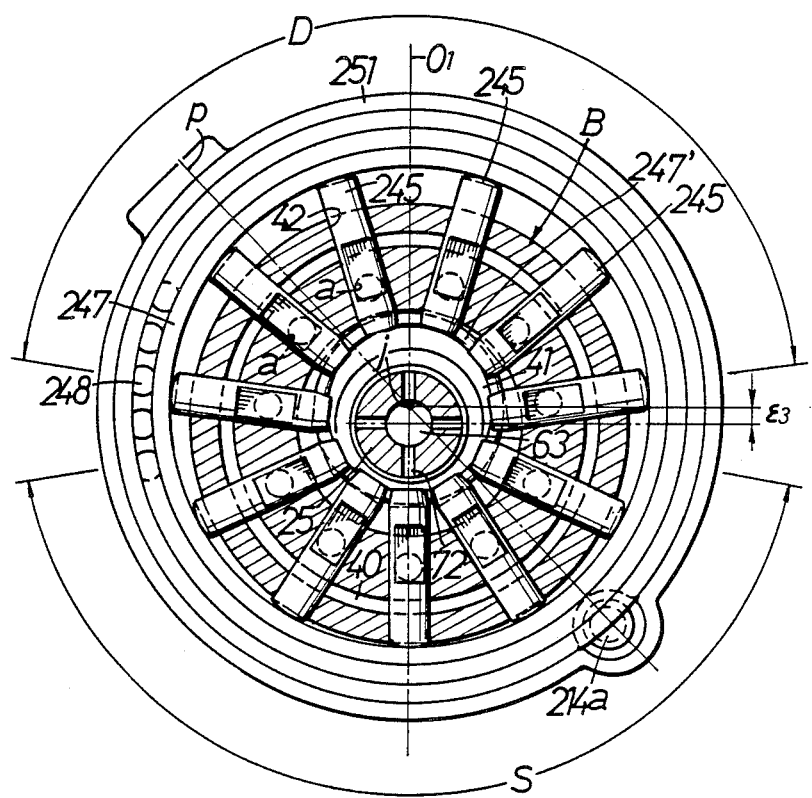
Figure 16A:
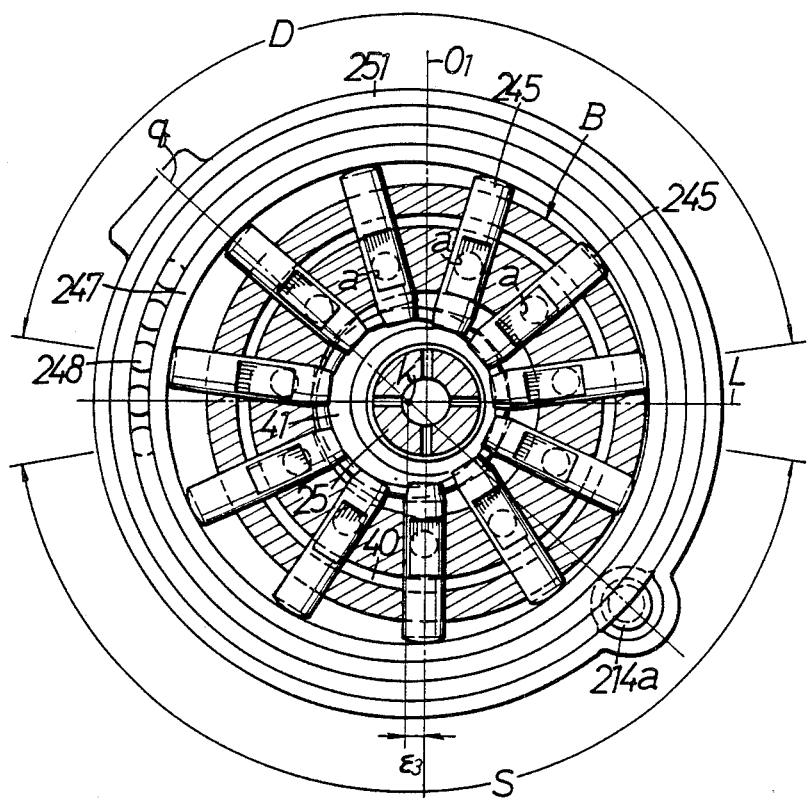
FIG. 16A is an operative view similar to FIG. 16.

A first eccentric wheel 247 engaging outer ends of the first distributor valves 245, 245—surrounds these valves, is supported through a ball bearing 248 on a first control ring 251 connected to the input member 205, and is normally disposed in a first eccentric position j eccentric by a given distance $\epsilon_3$ from a center of the output shaft 25 along a phantom trunnion axis 01 of the pump swash plate 10, as shown in FIG. 16. Therefore, when relative rotation occurs between the input member 205 and a pump cylinder 7, each of the first distributor valves 245 reciprocates within the valve bore 42 between a radially outer position and a radially inner position in a stroke of a distance two times the eccentric amount $\epsilon_3$ of the first eccentric wheel 247.

Figure 14:
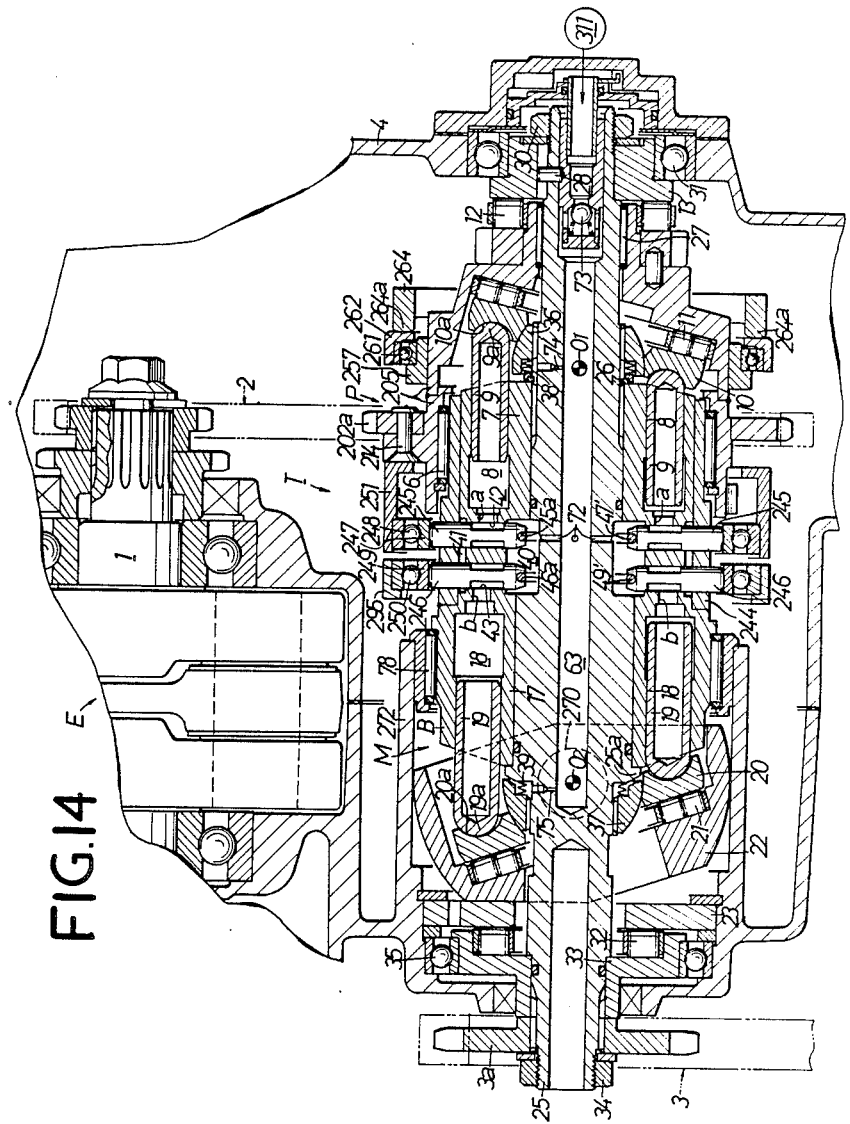
Figure 15:
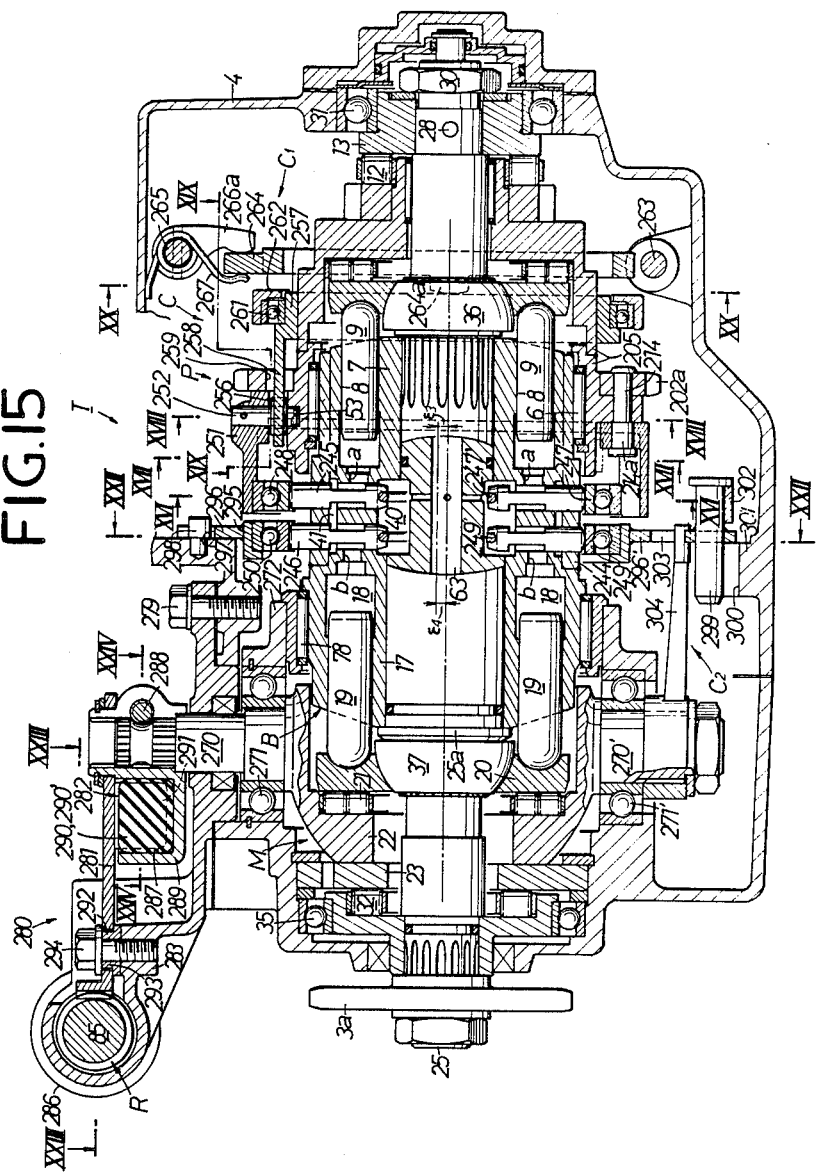
Figure 17:
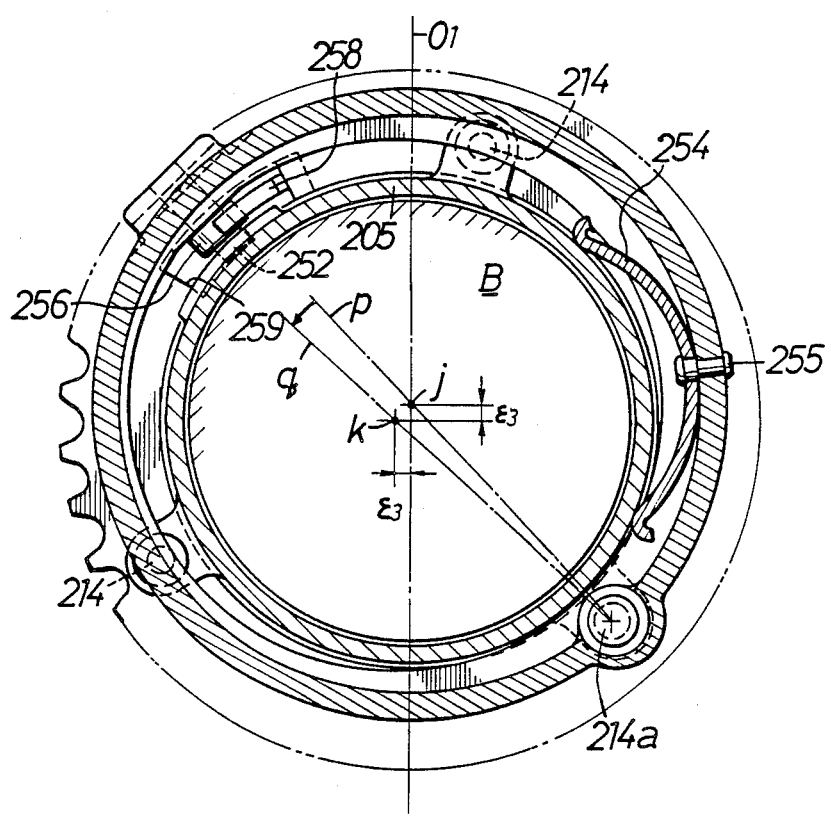
Figure 19:
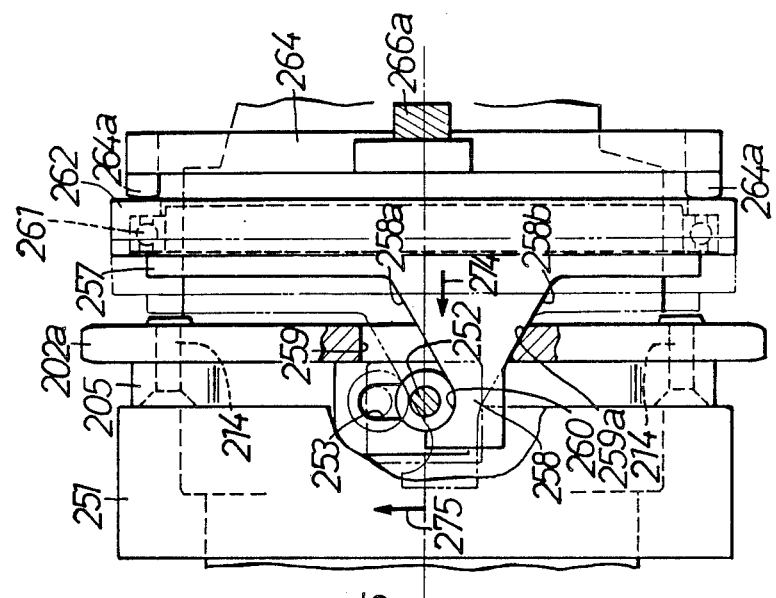
Figure 18:
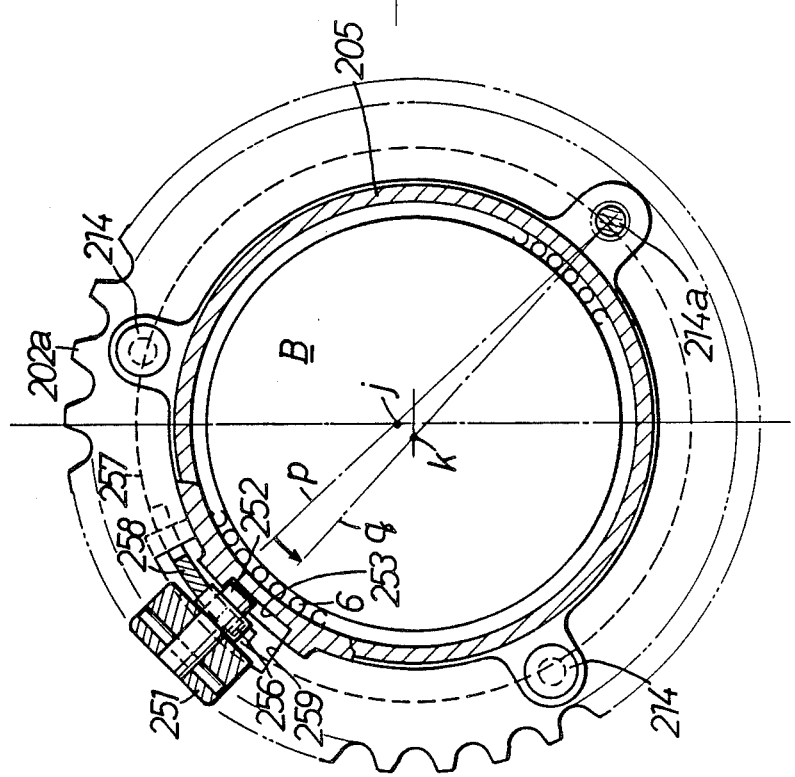

Referring to FIGS. 14 to 16, the first control ring 251 is pivotally connected to the input member 205 through a pivot 214a formed extending from one end of one of the rivets 214 connecting the sprocket 202a to the input member 205. That is, the first control ring 251 swings about the pivot 214a between a clutch-on position p and a clutch-off position q as shown in FIG. 16. At the clutch-on position p, the first control ring 251 controls the first eccentric wheel 247 to the first eccentric position j eccentric by $\epsilon_3$ from the center of the output shaft 25 along the phantom trunnion axis 01, and at the clutch-off position q, it controls the first eccentric wheel 247 to a second eccentric position k eccentric by a distance $\epsilon_3$ from the center of the output shaft 25 along line a L perpendicular to the phantom trunnion axis 01. To regulate the extent of such swinging movement of the first control ring 251, a guide pin 252 secured to the control ring 251 and protruded from an inner peripheral surface thereof is slidably engaged in a circumferential guide groove 253 formed in an outer periphery of the input member 205. A leaf spring 254 is interposed between the first control ring 251 and the input member 205 to resiliently urge the first control ring 251 toward the clutch-on position p and is secured at its central portion to the first control ring 251 by a rivet 255, as shown in FIG. 17.

A roller 256 is attached to the guide pin 252, and a push arm 258 projecting from one side of an operating ring 257 is enagaged with the roller 256. As shown in FIG. 15, the operating ring 257 is slidably and rotatably fitted over the outer peripheral surface of the input member 205 on the side of the sprocket 202a opposite to the first control ring 251 and has the push arm 258 passed through a through hole 259 made in the sprocket 202a.

The push arm 258 has at its fore end a recess 260 engaged by one side of the roller 256 (see FIG. 19) so as to allow the first control ring 251 to swing toward the clutch-off position q. The push arm 258 is also converged to have a reduced circumferentail width toward the fore end thereof, comprising one slant 258a forming such converged shape connected to the recess 260 and another slant 258b slidably engaged with a guide slant 259a formed on an inner surface of the through hole 259.

Referring to FIG. 15, a release ring 262 is rotatably mounted around an outer periphery of the operating ring 257 through release bearings 261, and a pressing projection 264a of an annular clutch lever 264, which is swingably pivoted at 263 to the crank case 4 to surround the input member 205, abuts against an outer end of the release ring 262.

Figure 20:
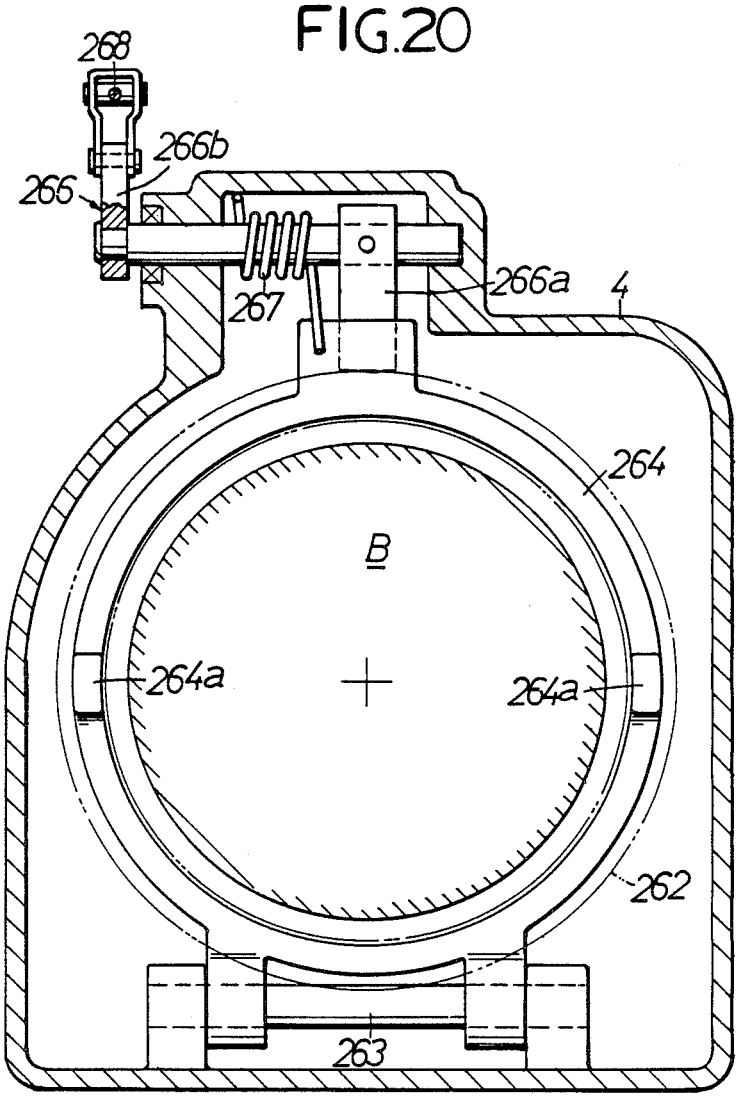

As seen in FIGS. 15 and 20, an inner lever 266a of the bell crank 266 pinned at 265 to the crank case 4 is connected to a swingable end of the clutch lever 264 so as to permit the lever 266a to push the clutch lever 264 toward the release ring 262, and a return spring 267 is connected to the clutch lever 264 for resiliently urging the clutch lever 264 toward the side opposite to the release ring 262.

The bell crank 266 includes the inner lever 266a disposed within the crank case 4 and an outer lever 266b disposed outside the crank case 4, and a clutch operating lever (not shown) operated by a driver is connected to the outer lever 266b through a wire 268.

Each of second distributor valves 246 is also formed into a spool type similar to that of the first distributor valve 245, as shown in FIG. 21.

A second eccentric wheel 249 engaging the outer ends of the second distributor valves 246 is controlled, as shown in FIG. 22, to an eccentric position l eccentric by a given distance $\epsilon_4$ from the center of the output shaft 25 along the tilting axis, i.e., the trunnion axis 02 of the motor swash plate 20 and a concentric position m concentric with the output shaft 25.

When the second eccentric wheel 249 assumes the first eccentric position l, each of the second distributor valves 246, as the motor cylinder is rotated, reciprocates within the valve bore thereof between the radially outer and inner positions in a stroke of a distance two times the eccentric amount $\epsilon_4$ of the second eccentric wheel 249, and when the second eccentric wheel 249 assumes the concentric position m, all the second distributor valves 246, 246—are arrested in the central position despite rotation of the motor cylinder 17.

Referring again to FIG. 15, the swash plate holder 22 is integrally provided at its opposite ends with a pair of upper and lower trunnion shafts 270 and 270' aligned on the trunnion axis 02 of the motor swash plate 20, which trunnion shafts are rotatably supported through roller bearings 271 and 271' on the opposite side walls of the cylindrical motor housing 272 integral with the crank case 4, respectively. In other words, the trunnion axis 02 is defined by the trunnion shafts 270 and 270'. The motor housing 272 also rotatably supports the motor cylinder 17 through a needle bearing 273.

In the above arrangement, the first eccentric wheel 247 is controlled to the first eccentric position j by the first control ring 251 assuming the clutch-on position p. On the other hand, when the second eccentric wheel 249 assumes the first eccentric position l, the suction and discharge strokes, as the input member 205 of the hydraulic pump P is rotated from the first decelerator 2, are alternately imparted to the pump plungers 9, 9—by the pump swash plate 10. A region S of suction stroke and a region D of discharge stroke of the hydraulic pump P are illustrated in FIG. 16. Then, the first distributor valves 245 located in the suction stroke region S are moved to the inner position by the cooperation of the first eccentric wheel 247 with the follower wheel 247', and the first distributor valves 245 existing in the discharge stroke region D are moved to the outer position by the cooperation of the first eccentric wheel 247 with the follower wheel 247'. Therefore, each of the pump plungers 9 draws the working oil from the inner oil passage 40 into the cylinder bore 8 in the suction stroke and pumps the working oil from the cylinder bore 8 into the outer oil passage 41 in the discharge stroke.

The high pressure working oil pumped into the outer oil passage 41 is passed through the second distributor valve 246 controlled to the outer position by the second eccentric wheel 249 and the follower wheel 249' into the motor port b existing in the expansion stroke region Ex (see FIG. 22) of the hydraulic motor M, while the working oil discharged from the motor port b existing in the retraction stroke region Sh (see FIG. 22) is passed into the inner oil passage 40 through the second distributor valve 246 controlled to the inner position by the second eccentric wheel 249 and the follower wheel 249'.

During this operation, the cylinder block B is driven and rotated by the sum of a reaction torque received by the pump cylinder 7 from the pump swash plate 10 through the pump plungers 9 in the discharge stroke and a reaction torque received by the motor cylinder 17 from the motor swash plate 20 through the motor plungers 19 in the expansion stroke, and such rotational torque is transmitted from the output shaft to the secondary decelerator 3.

Description will now be made of a shifting device C in the second embodiment. In this embodiment, there are provided a first shifting device C1 for changing the eccentric positions of the first eccentric wheel 247 and a second shifting device C2 for changing the eccentric positions of the second eccentric wheel 249.

The first shifting device C1 includes as essential components the first control ring 251, operating ring 257, release ring 262, clutch lever 264, bell crank 266 and the like. In the first shifting device C1, if the clutch lever 264, during the operation as described above, is swung toward the release ring 262 against the force of the return spring 267 by the operation of the clutch operating lever (not shown) through the wire 268 and bell crank 266, a pressing force applied to the release ring 262 acts on the operating ring 257 through the release bearing 261 to slide the operating ring 257 in the left-hand direction as indicated by an arrow 274 in FIG. 19, thereby pushing the push arm 258 deeply into the through hole 259. Thereupon, even if the axial displacement of the operating ring 257 is slight, a large circumferential displacement indicated by 275 can be generated in the roller 256 by the guide slant 259a of through hole 259 pressing the slant 258b of the push arm 258 and by of the slant 258a of push arm 258 pressing the roller 256, thereby allowing the first control ring 251 to be swung from the clutch-on position p to the clutch-off position q against the force of the leaf spring 254.

Consequently, the first eccentric ring 247 is displaced from the first eccentric position j to the second eccentric position k. In each of the regions S and D of suction and discharge strokes of the hydraulic pump P, half of the pump ports a are put into communication with the inner oil passage 40 and the other half are put into communication with the outer oil passage 41 by the second distributor valves 246, 246—, thereby causing the hydraulic pump P to be brought into a short-circuited state. Therefore, the high pressure working oil discharged from the pump ports a in the discharge stroke region D of the hydraulic pump P is immediately drawn into the pump ports a in the suction stroke region S and hence, the transfer of the working oil between the hydraulic pump P and the hydraulic motor M is ceased, to provide the cluth-off state in which the transfer of power from the hydraulic pump P to the hydraulic motor M is interrupted.

In this way, the first control ring 251 and the operating ring 257 constituting the first shifting device C1 function as clutch control means.

Figure 23:
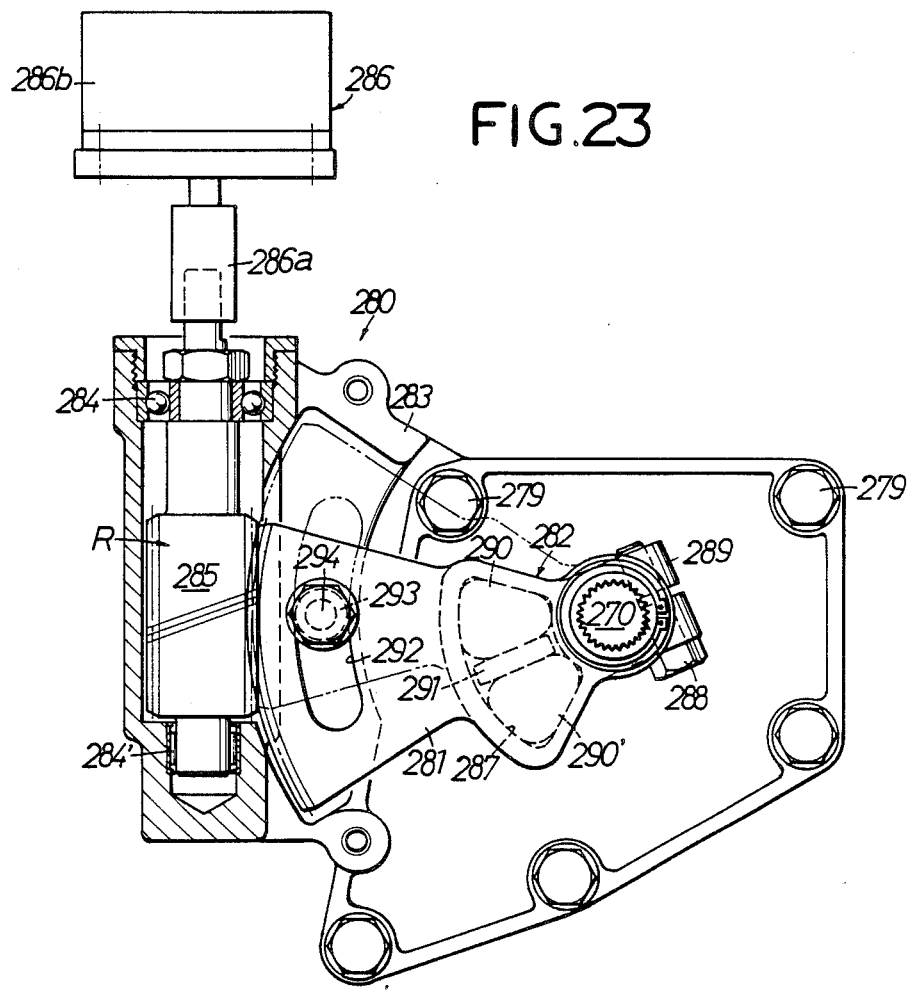
Figure 24:
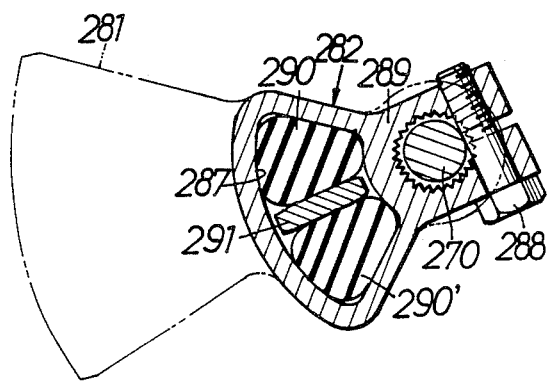
Figure 26:
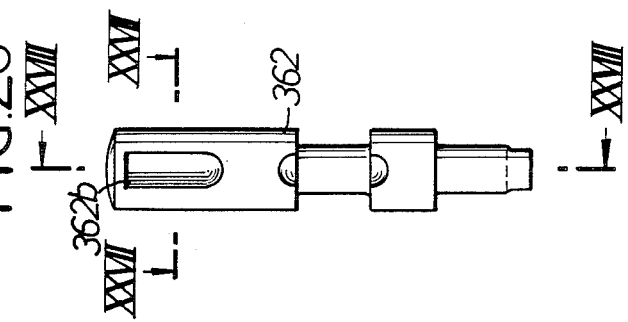
Figure 27:
Figure 28:
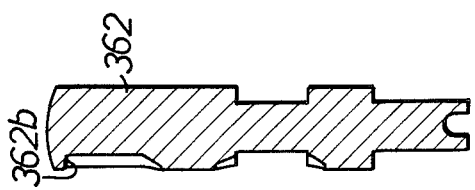
Figure 25:
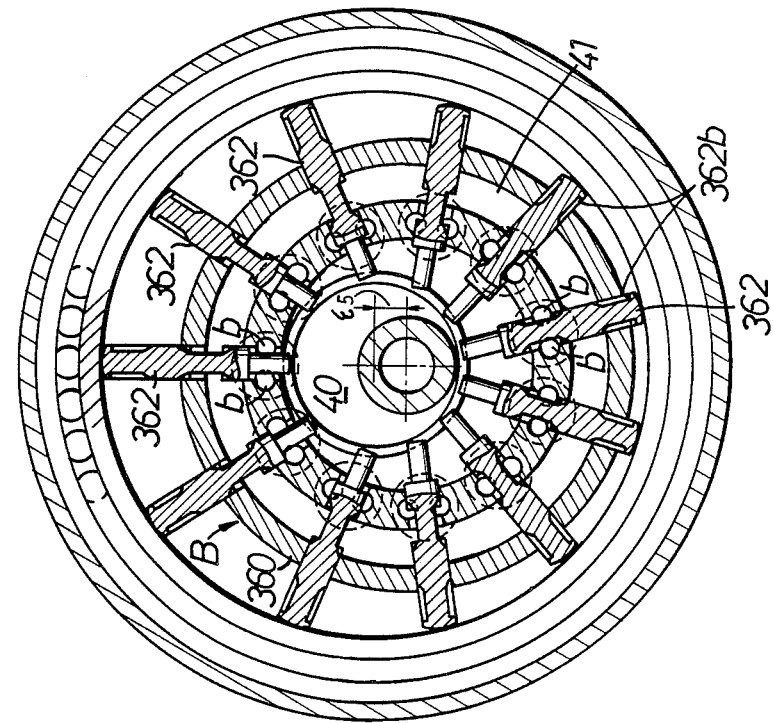

Referring to FIGS. 14, 23 and 24, a transmission controller 280 is connected to the trunnion shaft 270 for controlling the tilting angle of the motor swash plate 20 through the trunnion shaft 270. The transmission controller 280 comprises a sector gear 281 rotatably supported on the trunnion shaft 270, a damper 282 resiliently connecting the sector gear 281 to the trunnion shaft 270, a worm gear 285 which is supported through bearings 284 and 284' on a bracket plate 283 secured to the crank case 4 by a bolt and is meshed with the sector gear 281, and a reversible DC electric motor 286 having a drive shaft 286a connected to the worm gear 285. The electric motor 286 has a stator 286b fixed in place on the crank case 4.

The sector gear 281 and the worm gear 285 constitute a decelerator R which is capable of transmitting the rotation of the drive shaft 286a to the trunnion shaft 270 at a reduced speed, but becomes a locked state when receiving a reverse load from the shaft 270 side.

The damper 282 includes a damper body 289 secured to the trunnion shaft 270 by a bolt 288 and having a buffer chamber 287 of a sector shape with its center on the trunnion shaft 270, and a pair of rubber buffer members 290 and 290' charged in the buffer chamber 287. A transmitting piece 291 protruding from one side of the sector gear 281 is interposed between both of the buffer members 290 and 290'.

If the electric motor 286 is rotated normal or reverse direction, such rotation can be transmitted from the worm gear 285 to the sector gear 281 at a reduced speed and further through the transmitting piece 291, the buffer member 290 or 290' and the damper body 289 to the trunnion shaft 270 to rotate the trunnion shaft 270 in a direction to stand up or tilt down the motor swash plate 20.

In this case, if a pulse is produced in the thrust load applied from the group of the motor plungers 19, 19—to the motor swash plate 20, it is absorbed by the resilient deformation of the buffer members 290 and 290', thereby making it possible to reduce a burden imposed on to the worm gear 285 and the sector gear 281.

In addition, when the electric motor 286 is stopped to hold the motor swash plate 20 at any angle, the worm gear 285 cannot be driven by the sector gear 281 even if the motor swash plate 20 receives a moment in a stanting-up or tilting-down direction from the group of the motor plungers 19, 19—and such moment is transmitted through the trunnion shaft 270 to the sector gear 281. That is, both the gears 281 and 285 assume the locked state and do not permit rotation of the trunnion shaft 270, ensuring that the motor swash plate is reliably held in the current position.

In order to regulate the standing and any tilted positions of the motor swash plate 20 provided by the electric motor 286, a regulating groove 292 is made in the sector gear 281 into a circular arc concentric with the sector gear 281, and a regulating collar 293 slidably engaging the regulating groove 292 is secured to the bracket plate 283 by a bolt 294.

Referring to FIGS. 15 and 22, the second shifting device C2 includes, as essentail components, a second control ring 295, a return spring 302, and a control lever 304. The second eccentric wheel 249 is supported on the second control ring 295 through bearings 250. The second control ring 295 has a pair of ears 296 and 296' at the opposite sides in the direction of the trunnion axis O2. A U-shaped guide groove 297 extending in the direction of the trunnion axis O2 is made in one ear 296, and a guide pin 298 slidably inserted in the guide groove 297 is fixed to the crank case 4. A second guide pin 299 is fixedly mounted in the other ear 296', and a support portion 301 is mounted on the crank case 4 protrude therefrom and has a U-shaped guide groove 300 engaged by the guide pin 299 and extending in the direction of the trunnion axis O2. In this way, the second control ring 295 is displaceable in the direction of the trunnion axis O2, so that this displacement enables the second eccentric wheel 249 to assume the eccentric position l and the concentric position m.

A return spring 302 in the form of a leaf spring is provided in close contact with the guide pin 299 integral with the second control ring 295 to resiliently urge the second control ring 295 toward the eccentric position l of the second eccentric wheel 249.

Further, a cam hole 303 is provided in the ear 296', and a control lever 304 secured to the trunnion shaft 270' is inserted in the cam hole 303. That inner surface of the cam hole 303 which is closer to the return spring 302 is formed as a slant surface 303a engaged by the control lever 304 and adapted to be pressed by the control lever 304 interlockingly with the standing-up movement of the motor swash plate 20. This pressing action causes the second control ring 295 to be displaced against the force of the return spring 302 so that the second eccentric wheel 249 is displaced from the eccentric position l toward the concentric position m and the second eccentric wheel 249 is held at the concentric position m in the upstanding state of the motor swash plate 20.

Figure 22A:
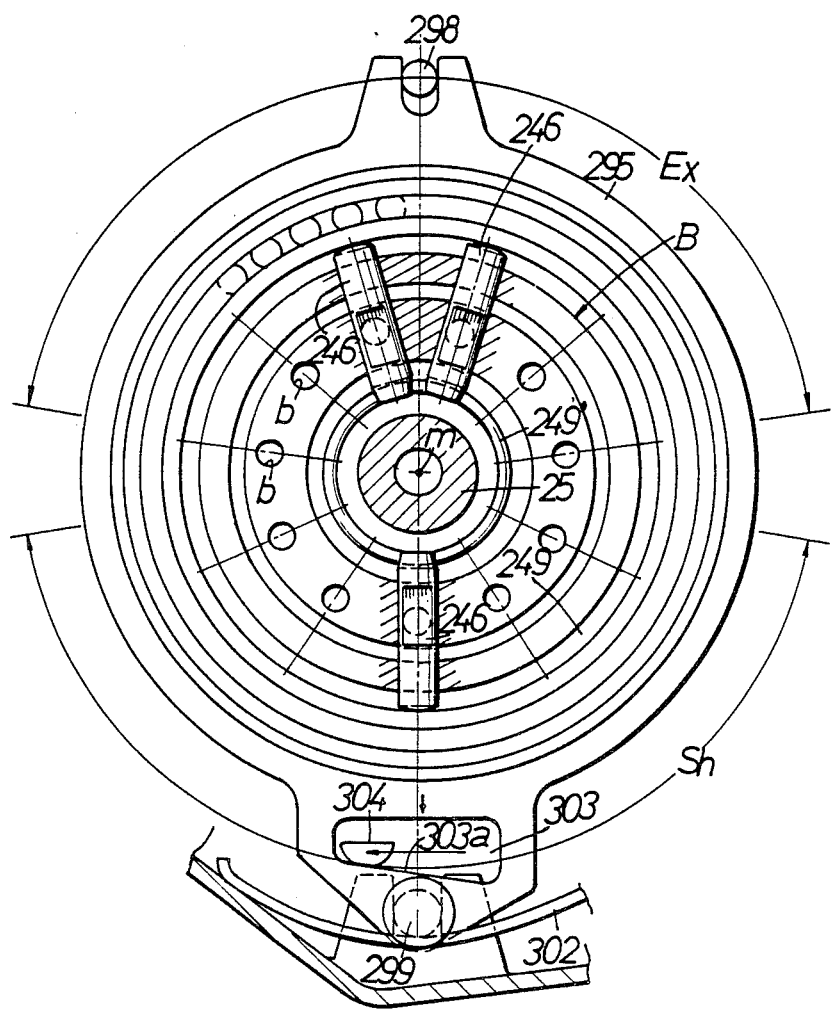
FIG. 22A is an operative view similar to FIG. 22.

When the second eccentric wheel 249 has reached the concentric position m, all the second distributor valves 246, 246—are closed as shown in FIG. 22A, so that both of the higher and lower oil passages 41 and 40 are cut off their communication with the hydrulic motor M. As a result, the volume of the low pressure circuit communicating with the hydraulic pump P decreases by an amount corresponding to the volume of the hydraulic motor M. Therefore, even if some bubbles are contained in the working oil, the amount of working oil compressed by the hydraulic pump P is extremely small, ensuring that the relative rotation between the input member 205 and the output shaft 25 can be suppressed to an extremely low level. Thus, the transmitting efficiency can be enhanced in the speed ratio of 1.

In this case, the displacement of the second eccentric wheel 249 to the concentric position m, in the illustrated embodiment, is continuously or steplessly affected interlockingly with the standing-up movement of the motor swash plate 20 by the action of the slant surface 303a of the cam hole 303 and hence, each of the second distributor valves 246, 246—also continuously performs its own closing motion and ultimately attains a closed state. Accordingly, the transmitting efficiency slowly begins to increase before attainment of such closed state, so that a transmitting shock can be prevented from generating during such valve closing operation. When the extent of the transmitting shock is as low as acceptable, the closing of the second distributor valves 246, 246—may be rapidly conducted when the motor swash plate 20 is moved to an upright position.

FIGS. 25 to 28 illustrate a third embodiment in which the present invention is applied to a swash plate type hydraulic motor of a hydrostatic continuously variable transmission as in the above embodiments. In the third embodiment, it is possible for distributor valves 362, 362—adapted for permitting the transfer of a working oil between the motor cylinder bores and the higher and lower pressure oil passage 41 and 40 to assume a position eccentric by a distance 5 larger than in the usual case with respect to the rotational center of the cylinder block B through operation of a shifting device (not shown). In this illustrated eccentric position, the inside of the higher oil passage 41 is put into communication with the outside of the cylinder block B by way of lengthwise grooves 362b each defined around an outer periphery of the fore end of each of the distributor valves 362,362—to leak out a high pressure oil which is to be passed into the motor cylinder bores.

It will be understood that such construction is of course also applicable to a working oil distributing arangement for the hydraulic pump.

What is claimed is:

1. A swash plate type hydraulic system comprising a cylinder block having a number of cylinder bores annularly arranged therein, a group of plungers each slidably received in each of said cylinder bores, a swash plate engaging those ends of said plungers which protrude from said cylinder bores, and higher and lower pressure oil passages concentrically defined in said cylinder block in a manner distanced from each other, wherein the transfer of a working oil between said cylinder bores and said higher and lower pressure oil passages is conducted during relative rotation between said cylinder block and a member supporting said swash plate, and wherein a plurality of distributor valves are provided in said cylinder block in a radially arranged configuration for reciprocation between radially outer and inner positions to permit said respective cylinder bores to alternately communicate with said higher and lower pressure oil passages; an eccentric wheel is provided to abut against the outer ends of said distributor valves in such a manner to permit each of said distributor valves to reciprocate interlockingly with the relative rotation between the cylinder block and the swash plate supporting member when said eccentric wheel assumes a position eccentric with respect to a center of rotation of said cylinder block; and a shifting device is provided for shifting an eccentric relationship of said eccentric wheel with respect to the center of rotation of said cylinder block.

2. A swash plate type hydraulic system according to claim 1, wherein said shifting device operates to change an eccentric direction of said eccentric wheel with respect to the cylinder block.

3. A swash plate type hydraulic system according to claim 1, wherein said shifting device operates to change an eccentric distance between the center of rotation of said cylinder block and the center of said eccentric wheel.

4. A swash plate type hydraulic system according to claim 1, wherein said shifting device operates to change an eccentric direction of the center of said eccentric wheel with respect to the center of rotation of said cylinder block and an eccentric distance between these centers.

5. A swash plate type hydraulic system according to claim 3 or 4, wherein said shifting device enables said eccentric wheel to assume a position concentric with said cylinder block.

6. A swash plate type hydraulic system according to claim 1, wherein said hydraulic system is a hydraulic pump.

7. A swash plate type hydraulic system according to claim 1, wherein said hydraulic system is a hydraulic motor.

8. A swash plate type hydraulic system according to claim 1, wherein said hydraulic system comprises a swash plate type hydraulic pump and a swash plate type hydraulic motor.

9. A swash plate type hydraulic system according to claim 8, wherein said eccentric wheel is a first eccentric wheel and further including a second eccentric wheel; wherein a hydraulic closed circuit including said lower and higher pressure oil passages is formed between said hydraulic pump and said hydraulic motor; said distributor valve group consists of a group of first distributor valves for controlling the transfer of a working oil between said group of cylinder bores for the hydraulic pump and said lower and higher pressure oil passages, and a group of second distributor valves for controlling the transfer of the working oil between said group of cylinder bores for the hydraulic motor and said lower and higher pressure oil passages; said first eccentric wheel abutting against the outer ends of said first distributor valves and said second eccentric wheel abutting against the outer ends of said second distributor valves; and said shifting device is associated with at least one of said first and second eccentric wheels.

10. A swash plate type hydraulic system according to claim 9, wherein said shifting device comprises a first shifting device associated with said first eccentric wheel and a second shifting device associated with said second eccentric wheel.

11. A swash plate type hydraulic system according to claim 8, 9 or 10, wherein said hydraulic pump cylinder bores and said hydraulic motor cylinder bores both are made in said cylinder block.

12. A swash plate type hydraulic system according to claim 1, 3 or 4, wherein when said eccentric wheel assumes a predetermined position through operation of said shifting device, the communication between said lower and higher pressure oil passages is cut off to provide an oil-locked state.

13. A swash plate type hydraulic system according to claim 12, wherein said predetermined position is a position in which said eccentric wheel is concentric with said cylinder block.

14. A swash plate type hydraulic system according to claim 12, wherein said swash plate is tiltable between an upright position and a certain tilted position, and when said swash plate is in the upright position, said eccentric wheel assumes said predetermined position.

15. A swash plate type hydraulic system according to claim 1, 2, 3 or 4, wherein when said eccentric wheel assumes a predetermined position through operation of said shifting device, said hydraulic system is brought into a short-circuited state.

16. A swash plate type hydraulic system according to claim 15, wherein when said eccentric wheel is in said predetermined position, said distributor valves reciprocate to escape a high pressure in the higher pressure oil passage into the lower pressure oil passage.

17. A swash plate type hydraulic system according to claim 15, wherein when said eccentric wheel is in said predetermined position, said distributor valves reciprocate to escape a high pressure in the higher pressure oil passage to the outside.

18. A swash plate type hydraulic system according to claim 1, 2, 3 or 4, wherein said swash plate is capable of standing up and inclining while rotating about an axis thereof; said plungers are provided of an odd number; said shifting device is capable of selectively shifting said eccentric wheel to any of first, second and third eccentric positions, so that when said eccentric wheel is in the first eccentric position, distribution of thrust load exerted to said swash plate by said plungers in their strokes moving out of the bores is equally balanced on opposite sides of the axis of said swash plate; when said eccentric wheel is in the second eccentric position, said thrust load distribution is deviated to be larger on one side of said axis than on the other side to impart a moment to said swash plate in a standing-up direction; and when said eccentric wheel is in the third eccentric position, said thrust load distribution is deviated to be larger on the other side of said axis to impart a moment to said swash plate in a tilting direction.

19. A swash plate type hydraulic system according to claim 18, wherein a control lever interlocking with the tilting movement of said swash plate is connected to a piston slidably received in a stationary cylinder; first and second oil chambers defined between said cylinder and piston and opposed to each other through said piston are interconnected through a hydralic conduit filled with an oil; and valve means is interposed in said hydraulic conduit for interruping said conduit when said eccentric wheel is in the first eccentric position.

20. A swash plate type hydraulic system according to claim 1 or 2, wherein said eccentric wheel selectively assumes first and second eccentric positions through operation of said shifting device; and said shifting device includes a control ring pivoted on said swash plate supporting member, for pivoting said eccentric wheel between said first and said second eccentric positions, and an operating ring slidably fitted to said supporting member and interlocking with said control ring.

21. A swash plate type hydraulic system according to claim 20, wherein said hydraulic system is a hydraulic pump, wherein said distributor valves are controlled in such a manner that when said eccentric wheel is in the first eccentric position, pump ports located in a region of discharge stroke of said hydraulic pump are put into communication with said higher pressure oil passage, while pump ports located in a region of suction stroke of said hydraulic pump are put into communication with said lower pressure oil passage, and when said eccentric wheel is in said second eccentric position, the hydraulic pump is brought into a short-circuited state; and wherein said supporting member is an input member of said hydraulic pump.

22. A swash plate type hydraulic system according to claim 21, wherein the pivoting movement of said eccentric wheel is possible even during rotation of said input member.

23. A swash plate type hydraulic system according to claim 1, wherein said hydraulic system is applied to each of a swash plate type hydraulic pump and a swash plate type hydraulic motor which constitute a hydrostatic continuously variable transmission.

24. A swash plate type hydraulic system according to claim 23, wherein a hydraulic closed circuit including said lower and higher pressure oil passages is formed between said hydraulic pump and said hydraulic motor; said plurality of distributor valves consists of a group of first distributor valves for controlling the transfer of a working oil between said group of cylinder bores for the hydraulic pump and said lower and higher pressure oil passages, and a group of second distributor valves for controlling the transfer of the working oil between said group of cylinder bores for the hydraulic motor and said lower and higher pressure oil passages; and said eccentric wheel associated with said hydraulic pump consists of a first eccentric wheel abutting against the outer ends of said first distributor valves and said eccentric wheel associated with said hydraulic motor consists of a second eccentric wheel abutting against the outer ends of said second distributor valves.

25. A swash plate type hydraulic system according to claim 23 or 24, wherein the cylinder block associated with said hydraulic pump and the cylinder block associated with said hydraulic motor are integrally connected to form a single cylinder block, and wherein said cylinder bores associated with said hydraulic pump and said cylinder bores associated with said hydraulic motor are made in said single cylinder block.

26. A swash plate type hydraulic system according to claim 1, wherein said cylinder block is part of a swash plate type hydraulic pump, and wherein said swash plate hydraulic pump and a swash plate type hydraulic motor constitute a hydrostatic continuously variable transmission.

27. A swash plate type hydraulic system according to claim 26, wherein a hydraulic closed circuit including said lower and higher pressure oil passages is formed between said hydraulic pump and said hydraulic motor; said plurality of distributor valves consists of a group of first distributor valves for controlling the transfer of a working oil between said group of cylinder bores for the hydraulic pump and said lower and higher pressure oil passages, and a group of second distributor valves is provided for controlling the transfer of the working oil between a group of cylinder bores for the hydraulic motor and said lower and higher pressure oil passages; said eccentric wheel consists of a first eccentric wheel abutting against the outer ends of said first distributor valves and a second eccentric wheel abuts against the outer ends of said second distributor valves.

28. A swash plate type hydraulic system according to claim 27, wherein a second shifting device is associated with said second eccentric wheel for shifting an eccentric relationship of said second eccentric wheel with respect to the center of rotation of said cylinder block.

29. A swash plate type hydraulic system according to claim 26, 27, or 28, wherein the cylinder block associated with said hydraulic pump and a cylinder block associated said hydraulic motor are integrally connected.

30. A swash plate type hydraulic system according to claim 1, wherein said cylinder block is part of a swash plate type hydraulic motor, and wherein said swash plate hydraulic motor and a swash plate type hydraulic pump constitute a hydrostatic continuously variable transmission.

31. A swash plate type hydraulic system according to claim 30, wherein a hydraulic closed circuit including said lower and higher pressure oil passages is formed between said hydraulic pump and said hydraulic motor; said plurality of distributor valves consists of a group of first distributor valves for controlling the transfer of a working oil between said group of cylinder bores for the hydraulic motor and said lower and higher pressure oil passages, and a group of second distributor valves is provided for controlling the transfer of the working oil between a group of cylinder bores for the hydraulic pump and said lower and higher pressure oil passages; said eccentric wheel consists of a first eccentric wheel abutting against the outer ends of said first distributor valves and a second eccentric wheel abuts against the outer ends of said second distributor valves.

32. A swash plate type hydraulic system according to claim 31, wherein a second shifting device is associated with said second eccentric wheel for shifting an eccentric relationship of said second eccentric wheel with respect to the center of rotation of said cylinder block.

33. A swash plate type hydraulic system according to claim 30, 31, or 32, wherein the cylinder block associated with said hydraulic pump and a cylinder block associated with said hydraulic motor are integrally connected.

34. A swash plate type hydraulic system comprising a cylinder block having a number of cylinder bores annularly arranged therein, a group of plungers each slidably received in one of said cylinder bores, a swash plate engaging those ends of said plungers which protrude from said cylinder bores, and higher and lower pressure oil passages defined in said cylinder block in a manner distanced from each other, wherein the transfer of a working oil between said cylinder bores and said higher and lower pressure oil passages is carried out during relative rotation between said cylinder block and a member supporting said swash plate, and wherein a plurality of distributor valves are provided in said cylinder block in a radially arranged configuration for reciprocation between radially outer and inner positions to permit said respective cylinder bores to alternately communicate with said higher and lower pressure oil passages; a distributor valve driving means is provided to cause said distributor valves to reciprocate interlockingly with the relative rotation between the cylinder block and the swash plate supporting member; and a shifting device is provided for shifting a relationship of said distributor valve driving means with respect to the distributor valves so as to change a mode of reciprocating movement of the valves.

35. A swash plate type hydraulic system according to claim 34, wherein said shifting device is adapted to change the amount of reciprocating movement of the valves.

36. A swash plate type hydraulic system according to claim 34, wherein said shifting device is adapted to change the phase of reciprocating movement of the valves in relation to the rotation of said cylinder block.

37. A swash plate type hydraulic system according to claim 34, wherein said shifting device is adapted to change the amount of reciprocating movement of the valves as well as the phase of such reciprocating movement in relation to the rotation of said cylinder block.

38. A swash plate type hydraulic system according to claim 35 or 37, wherein said valves are capable of assuming a state in which they do not reciprocate in response to the rotation of the cylinder block.

39. A swash plate hydraulic system according to claim 38, wherein in said state in which the valves do not reciprocate, the valves permit short-circuiting between the higher and lower pressure oil passages.

40. A swash plate type hydraulic system according to claim 35 or 37, wherein said valves are capable of assuming a state releasing a high pressure in the higher pressure oil passage to the outside.

41. A swash plate type hydraulic system according to claim 34, wherein said distributor valve driving means is an eccentric wheel abutting against radial ends of said disbributor valves, said eccentric wheel being normally located in an eccentric relation to a center of rotation of said cylinder block and being capable of changing said eccentric relation through operation of said shifting device.

42. A swash plate type hydraulic system according to claim 41, wherein said eccentric wheel is adapted to assume a position concentric with the rotational center of the cylinder block and at said concentric position the distributor valves allow short-circuiting between the higher and lower pressure oil passages.

43. A swash plate type hydraulic system according to claim 41, wherein said shifting device is adapted to change an amount of eccentricity between the eccentric wheel and the cylinder block.

44. A swash plate type hydraulic system according to claim 41, wherein said shifting device is adapted to change a direction of eccentricity between the eccentric wheel and the cylinder block.

45. A swash plate type hydraulic system according to claim 41, wherein said shifting device is adapted to change an amount and a direction of eccentricity between the eccentric wheel and the cylinder block.

* * * * *